US012257681B2

(12) United States Patent
Yang et al.

(10) Patent No.: US 12,257,681 B2
(45) **Date of Patent: *Mar. 25, 2025**

(54) ENERGY STORAGE AND STRIKING MECHANISMS AND NAIL GUNS HAVING SAME

(71) Applicant: TAIZHOU DAJIANG IND. CO. LTD., Wenling (CN)

(72) Inventors: Tao Yang, Wenling (CN); Mingjun Yang, Wenling (CN); Jinquan Huang, Wenling (CN); Haijun Li, Wenling (CN); Weirong Zhou, Wenling (CN)

(73) Assignee: TAIZHOU DAJIANG IND. CO. LTD., Wenling (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,815

(22) Filed: Sep. 15, 2023

(65) Prior Publication Data

US 2024/0091920 A1 Mar. 21, 2024

(30) Foreign Application Priority Data

Sep. 15, 2022 (CN) ......................... 202211124783.5
Sep. 15, 2022 (CN) ......................... 202211124788.8
Sep. 15, 2022 (CN) ......................... 202211125037.8
Sep. 15, 2022 (CN) ......................... 202222460859.3
Sep. 15, 2022 (CN) ......................... 202222461506.5

(51) Int. Cl.
*B25C 1/06* (2006.01)
*B25C 1/04* (2006.01)

(52) U.S. Cl.
CPC ................ *B25C 1/06* (2013.01); *B25C 1/047* (2013.01)

(58) Field of Classification Search
CPC .............. B25C 1/06; B25C 1/047; B25C 5/15
USPC .......................................................... 227/132
See application file for complete search history.

(56) References Cited

U.S. PATENT DOCUMENTS

| | | | | |
|---|---|---|---|---|
| 5,779,128 A * | 7/1998 | Szczerba | B25C 1/02 227/113 |
| 2003/0188878 A1* | 10/2003 | Paulhus | B25C 1/06 173/205 |
| 2007/0284406 A1* | 12/2007 | Okouchi | B25C 1/06 227/132 |
| 2008/0017689 A1* | 1/2008 | Simonelli | B25C 1/06 227/132 |

(Continued)

FOREIGN PATENT DOCUMENTS

| | | | |
|---|---|---|---|
| CN | 215395034 U | 1/2022 | |
| DE | 202020106188 U1 * | 12/2020 | B25C 1/06 |

*Primary Examiner* — Joshua G Kotis
(74) *Attorney, Agent, or Firm* — Troutman Pepper Locke; Tim Tingkang Xia, Esq.

(57) ABSTRACT

A nail gun having an energy storage mechanism for storing energy used for striking nails out of the nail gun, the energy storage mechanism comprises a guiding rod attached to a fixed plate assembly; a piston disposed on the guiding rod; a striking member mounted on the piston for striking the nails; at least one power spring disposed around an outer periphery of the guiding rod; a guide sleeve moveably disposed around the outer periphery of the guiding rod and between the power spring and the guiding rod; wherein a first end of the power spring abuts against the piston and is configured to be compressed to store energy.

15 Claims, 14 Drawing Sheets

(56) References Cited

U.S. PATENT DOCUMENTS

| | | | | |
|---|---|---|---|---|
| 2008/0210736 | A1* | 9/2008 | Blessing | B25C 1/06 227/132 |
| 2011/0303428 | A1* | 12/2011 | Roth | B25C 1/008 173/1 |
| 2017/0217004 | A1* | 8/2017 | Kato | B25C 5/15 |
| 2017/0297187 | A1* | 10/2017 | Nishikawa | B25C 1/06 |
| 2021/0060749 | A1* | 3/2021 | Yang | B25C 1/008 |
| 2021/0354277 | A1* | 11/2021 | Morimura | B25C 1/06 |
| 2022/0226977 | A1* | 7/2022 | Nettleton | B25C 5/13 |
| 2022/0226978 | A1* | 7/2022 | Nettleton | B25C 1/06 |
| 2024/0091918 | A1* | 3/2024 | Yang | B25C 1/06 |

* cited by examiner

ENERGY STORAGE AND STRIKING MECHANISMS AND NAIL GUNS HAVING SAME

CROSS-REFERENCE TO RELATED PATENT APPLICATIONS

This application claims priority to and benefit of Chinese Patent Application Nos. 202211124783.5, 202222461506.5, 202211124788.8, 202222460859.3, 202222461507.X, and 202211125037.8, all of which are filed on Sep. 15, 2022, and hereby incorporated by reference in their entireties.

FIELD OF THE INVENTION

This invention relates generally to fastening tools technology, and more particularly to energy storage and striking mechanisms and nail guns having the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Nail gun is a fastening tool, commonly used in construction. Currently, one widely used type of nail gun is the electric nail gun powered by a lithium battery. This type of nail gun uses a lithium battery for power, which drives a motor and the corresponding energy storage mechanism to push the piston. The piston then compresses at least one power spring to store energy. When striking a nail, the stored energy in the power spring drives the piston, which in turn drives the striking member mounted on the piston to strike out the nail. For details, one can refer to the applicant's prior Chinese patent No. CN215395034U.

However, there are still shortcomings in the aforementioned technologies. For example, the power spring is directly disposed onto the guiding rod. During the compression process when the power spring is driven by the piston, it is easy for the spring to deform. Once deformed, it easily generates friction with the guiding rod. This friction is rigid friction, and after long-term use, it is easy for the power spring to wear out, thereby shortening the lifespan of the power spring.

Therefore, a heretofore unaddressed needs exist in the art for a nail gun that makes it easier for ordinary users to replace the striking member and has relatively fewer components.

SUMMARY OF THE INVENTION

In one aspect, this invention relates to an energy storage mechanism used for a nail gun. The energy storage mechanism comprises a fixed plate assembly; a guiding rod attached to the fixed plate assembly; a piston disposed on the guiding rod; a striking member mounted on the piston for striking the nails; at least one power spring disposed around an outer periphery of the guiding rod; a guide sleeve moveably disposed around the outer periphery of the guiding rod and between the power spring and the guiding rod; wherein a first end of the power spring abuts against the piston and is configured to be compressed to store energy.

In one embodiment, the fixed plate assembly comprises a front fixed plate and a rear fixed plate for respectively mounting a front end and a rear end of the guiding rod; and wherein a second end of the power spring abuts against the rear fixed plate.

In one embodiment, the piston is disposed on the front end of the guiding rod in adjacent to the front fixed plate, and a cushion pad is disposed between the piston and the front fixed plate.

In one embodiment, the guide sleeve has a guide sleeve length that is shorter than at least one power spring length of the power spring when the power spring is compressed to a predetermined compressed position.

In one embodiment, the piston comprises a fixed part for securing the striking member; and an installation part receiving the power spring; wherein the installation part is tapered and comprises a large end and a small end; wherein the installation part comprises a through hole through which the guiding rod passes.

In one embodiment, the guide sleeve comprises a center hole through which the guiding rod passes; and wherein the center hole has a diameter smaller than a diameter of the small end of the installation part.

In one embodiment, the nail gun comprises a pushing component having at least one pushing section facing the piston for driving the piston towards the power spring for compressing power spring; a drive motor for driving the pushing component to rotate; and at least one pushed-end disposed on the piston configured for being pushed by the at least one pushing section.

In one embodiment, the at least one pushing section comprises a first pushing section and a second pushing section; wherein the at least one pushed-end comprises a first pushed-end and a second pushed-end, wherein the first pushed-end extends from the piston in the striking direction; and the second pushed-end extends from the piston towards the pushing component.

In one embodiment, the first pushing section is configured to push the first pushed-end; and the second pushing section is configured to push the second pushed-end.

In one embodiment, the first pushing section has a diameter larger than a diameter of the second pushing section.

In one embodiment, the pushing component further comprises a crank corner; wherein the crank corner comprises a first crank arm on which the first pushing section is disposed, and a second crank arm on which the second pushing section is disposed; and wherein the first crank arm and the second crank arm form a corner having a degree less than 180 degree.

In one embodiment, the first pushing section and the second pushing section are cylindrical and are respectively disposed on an outer ends of the first crank arm and the second crank arm; and wherein the first pushing section protrudes from an outer end of the first crank arm.

In another aspect of the invention, a nail gun comprises an energy storage mechanism as disclosed above; a control mechanism controlling the energy storage mechanism; wherein the control mechanism comprises a main switch comprises a pressing part and a main switch component; and a safety switch comprises a toggling part and a safety switch component.

In one embodiment, the main switch is configured to produce a first electronic signal; and the safety switch is configured to produce a second electronic signal; and wherein the main switch and the safety switch are in communication with the motor such that the motor is configured to operate when it receives both the first electronic signal and the second electronic signal.

In one embodiment, the toggling part comprises a toggle blade which is configured to contact an activation point of the safety switch component to generate the second electronic signal; a toggle rod having a first toggle rod end configured to contact the pushing component and a second toggle rod end configured to contact with the toggle blade to push it to disconnect from the activation point of the safety switch component; and a toggle blade seat having a toggle blade reset spring; wherein a first end of the toggle blade reset spring is in contact with the toggle blade; and a second end of the toggle blade reset spring extends out of the toggle blade seat and is in contact with the toggle rod; and wherein the toggle blade is hook-shaped and comprises a contact plate for contacting the activation point of the safety switch component; a toggling plate for contacting the toggle rod; and a connecting plate connecting the contact plate and the toggling plate.

In one embodiment, the contact plate has a contact plate length which is shorter than a length of the toggling plate; and wherein a gap is formed by the difference between the contact plate length and the toggling plate length; and wherein the second electronic signal is generated when the activation point of the safety switch component touches the contact plate; and wherein the second electronic signal is cut off when the activation point locates in the gap.

In one embodiment, the controlled driving assembly further comprises a crank assembly for pushing the toggle blade to interact with the safety switch component; wherein the crank assembly comprises an external crank with its outer end extending out of a muzzle mechanism of the nail gun and its inner end inserted into the casing of the nail gun; and an internal crank with its outer end connected to the external crank and its inner end connected to the toggle blade seat; and a crank reset spring disposed adjacent to the internal crank outer end.

In yet another aspect of the invention, a striking mechanism used for a nail gun having a muzzle mechanism. The striking mechanism comprises a piston movably disposed inside a casing of the nail gun; and a striking member having a first end detachably mounted on the piston, and a second end for striking the nails; wherein the piston comprises a fixed part on a first side facing the muzzle mechanism, and the first end of the striking member is connected to the fixed part; and an installation seat on a second side opposite to the muzzle mechanism; wherein the installation seat is configured to receive at least one power spring.

In one embodiment, the fixed part comprises a cross-shaped slot in the horizontal direction and a through hole passing through the cross-shaped slot in the vertical direction; wherein the first end of the striking member is received by the cross-shaped slot, and the first end of the striking member comprises an installation hole corresponding to the through hole in the fixed part; and wherein the striking member is attached to the fixed part by a fastener passing through the through hole and the installation hole.

In yet another aspect of the invention, a nail gun comprises a striking mechanism as disclosed above; an energy storage mechanism for storing energy for the striking mechanism; and a control mechanism controlling the energy storage mechanism.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
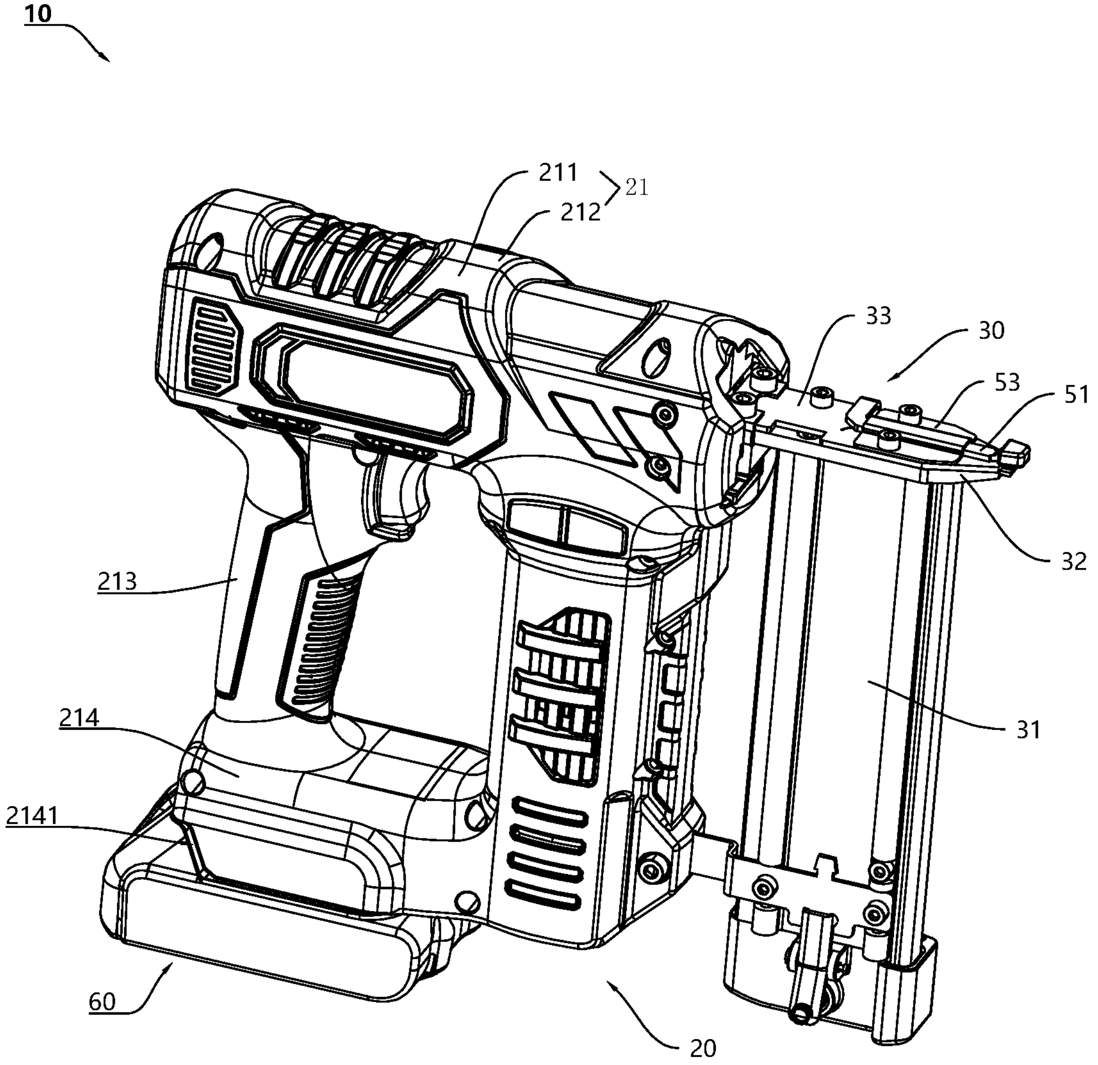
FIG. 1 is a schematic structural view of the nail gun according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in certain aspects, relates to energy storage and striking mechanisms and nail guns having the same. Embodiments of the invention are now described in conjunction with the accompanying drawings in FIGS. 1-23.

Embodiment 1

To address the above-mentioned issues, the present invention provides an energy storage mechanism that effectively reduces the wear of the power spring during movement, thereby extending the lifespan of the power spring. This invention also includes an energy storage controlling mechanism and a nail gun containing this energy storage mechanism, and it employs the following technical solutions:

The present invention introduces an energy storage mechanism designed to accumulate energy for striking nails within a nail gun with a casing. It includes the following features: a guiding rod fixedly mounted within the casing, a piston movably disposed on the guiding rod and equipped with a striking member for striking nails, and at least one power spring fitted around the outer circumference of the guiding rod. One end of the power spring abuts the piston and compresses to store energy when driven by the piston. Moreover, the outer circumference of the guiding rod also has a guide sleeve movably fitted thereon, which is positioned between the power spring and the guiding rod.

In one embodiment, the fixed plate assembly comprises front and rear fixed plates used to secure the front and rear ends of the guiding rod, and the other end of the power spring abuts the rear fixed plate. The piston is mounted on the guiding rod near the front fixed plate, with a buffer pad positioned between the piston and the front fixed plate. The guide sleeve is movably disposed on the guiding rod. When the power spring is compressed or released, the guide sleeve moves along the compression and release direction of the power spring, with the length of the guide sleeve being shorter than when the power spring is compressed to the maximum compression position.

In one embodiment, the piston includes a fixed part for securing the striking member and an installation part for installing the power spring. The installation part has a conical shape with a large end and a small end, and a through-hole is provided in the center for the guiding rod to pass through. The diameter of the center hole is smaller than the diameter of the small end.

In one embodiment, it also comprises a driving component with a pushing section facing the piston, used to push the piston towards the power spring to compress it for energy storage. A driving motor is used to drive the driving component to rotate. The piston is equipped with a pushed-end that cooperates with the pushing section. The pushed-end includes a first pushed-end extending from the piston along the direction of nail striking and a second pushed-end extending from the piston towards the driving component. The pushing section comprises a first pushing section that cooperates with the first pushed-end and a second pushing section that cooperates with the second pushed-end, with its outer diameter being smaller than that of the first pushing section.

In one embodiment, the driving component also includes a crank corner with a first crank arm for mounting the first pushing section and a second crank arm for mounting the second pushing section. The second crank arm is of equal length to the first crank arm, and an angle is formed between them. Both the first pushing section and the second pushing section are cylindrical and are respectively positioned at the outer ends of the first crank arm and the second crank arm. The outer ends of the first crank arm and the second crank arm are arc-shaped, with the outer edge of the first pushing section protruding from the outer end of the first crank arm.

The present invention also introduces an energy storage control mechanism for nail striking, installed inside a nail gun with a casing for controlling and driving the striking of nails. It includes an energy storage mechanism and a control component for controlling the operation of the energy storage mechanism. The control component includes a main switch with a pressing part and a main switch element, a safety switch with a toggle part and a safety switch element, and the main switch and the safety switch are connected in series. The energy storage mechanism is as described above.

In one embodiment, the control component may further include these features: the toggle part of the control component includes a toggle blade used to contact the touch point of the safety switch element to generate an electrical signal. There is also a toggle rod in the control component, with one end linked to the driving component and the other end linked to the toggle blade. The toggle part includes a contact plate to come into contact with the activation point of the safety switch element and a toggle plate to make contact with the toggle rod. When the activation point of the safety switch element contacts the contact plate, the safety switch element generates an electrical signal. When the activation point of the safety switch element separates from the contact plate, the safety switch element disconnects the electrical signal.

In one embodiment, the toggle part also has a toggle blade seat, inside which a toggle reset spring is placed. One end of the toggle part abuts the toggle reset spring, and the other end extends out to link with the toggle rod.

In one embodiment, the nail gun includes a casing with an internal mounting cavity, a muzzle mechanism installed at the front end of the casing, and an energy storage control mechanism installed within the mounting cavity. The energy storage control mechanism is the one described above.

Advantages and Effects of the Invention

With the energy storage mechanism, energy storage control mechanism, and nail gun according to the present invention, the inclusion of a guide sleeve between the guiding rod and the power spring effectively serves as a guide during the movement of the power spring. This prevents the spring from bending or deforming in other directions during contraction, reduces wear and friction during the movement of the power spring, and extends its lifespan, making the compression for energy storage smoother and more rapid.

Embodiment 1-1

FIG. 1 is a schematic structural view of the nail gun according to one embodiment of the invention.

Figure 2:
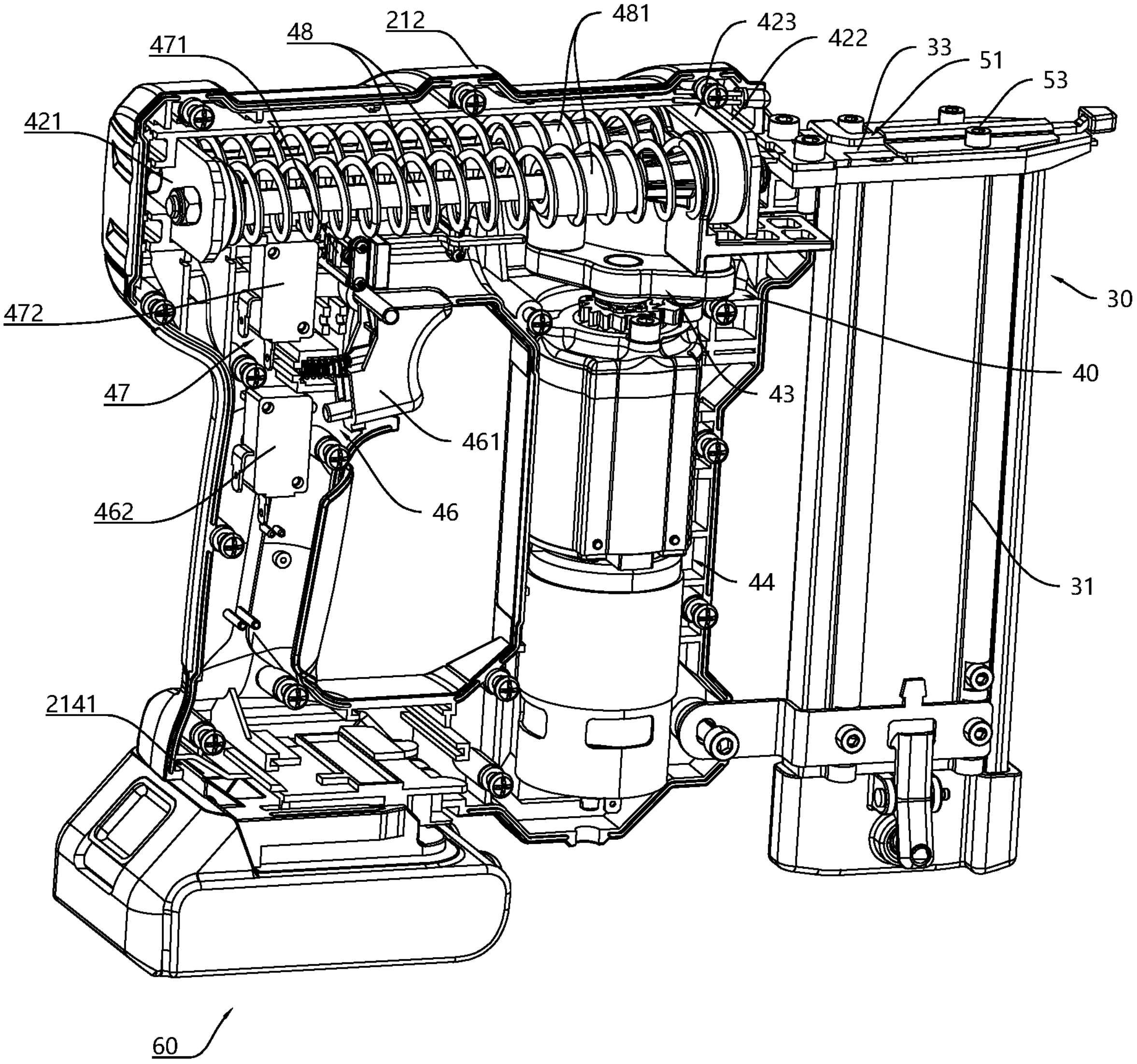
FIG. 2 is a schematic structural view of the nail gun with partial casing removed according to one embodiment of the invention.

FIG. 2 is a schematic structural view of the nail gun with partial casing removed according to one embodiment of the invention.

This embodiment provides an energy storage mechanism and a nail gun, which are easier to operate without compromising safety and nailing effects.

As shown in FIGS. 1 and 2, the nail gun 10 of this embodiment includes a casing 20, a muzzle mechanism 30, an energy storage mechanism 40, and a power supply unit (lithium battery 60). The casing 20 is an external case 21, which is formed by coupling a front cover plate 211 with a rear cover plate 212, creating an internal cavity for installing the energy storage mechanism 40. The casing 21 not only accommodates internal components like the energy storage mechanism 40 but also protects them. The main casing 21 includes a handle 213 for users to grip and a casing base 214 connected to the handle. Both the handle 213 and the casing base 214 are hollow structures. An battery installation slot 2141 locates on the casing base 214 for the detachable installation of the lithium battery 60. The power supply unit powers the entire nail gun. The muzzle mechanism 30 is for storing nails and allowing them to be struck and shot. The energy storage mechanism 40 drives the striking member in a predetermined reciprocating movement, enabling it to strike nails from the muzzle mechanism 30.

Figure 3:
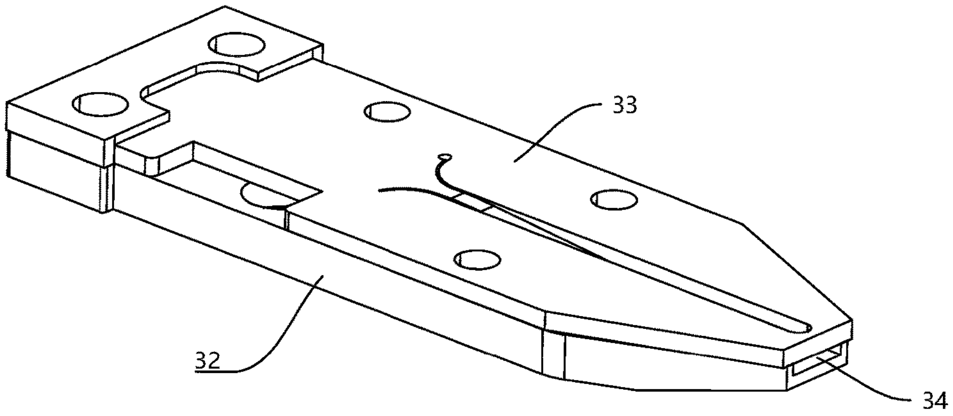
FIG. 3 is a partial structural diagram of a muzzle mechanism according to one embodiment of the invention.

FIG. 3 is a partial structural diagram of a muzzle mechanism according to one embodiment of the invention.

As depicted in FIGS. 2 and 3, the muzzle mechanism 30 is located at the front end of the casing 21. The muzzle mechanism 30 has a magazine 31 for holding nails, a muzzle member 32 installed at the top of the magazine, and a muzzle cover 33. A nail passage mechanism 34 locates between the muzzle member 32 and the muzzle cover 33, through which nails are shot out by the energy storage mechanism 40.

Figure 4:
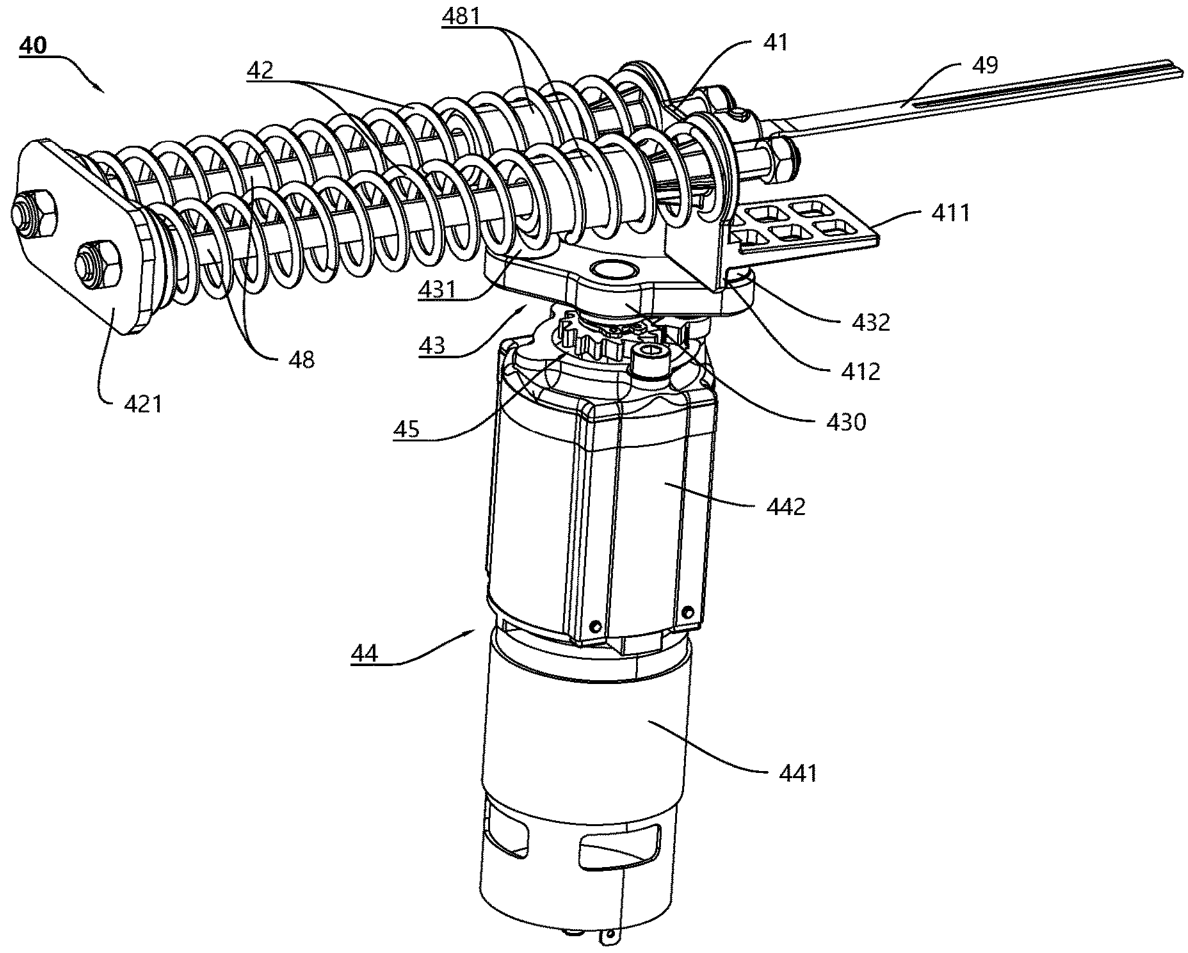
FIG. 4 is a schematic structural view of an energy storage mechanism according to one embodiment of the invention.

FIG. 4 is a schematic structural view of an energy storage mechanism according to one embodiment of the invention.

As shown in FIG. 4, the energy storage mechanism 40 includes a driving assembly and a control assembly. The driving assembly drives the nails in the striking direction, while the control assembly manages its operation. The driving assembly has a piston 41 moving within the casing 20, at least one power spring 42, at least one guiding rod 48, at least one guiding rod casing 481, a pushing component 43, and a motor 44 that turns the pushing component 43.

In one embodiment, the guiding rod 48 is installed within the casing 20 by means of a fixed plate assembly, and the piston 41 is movably disposed on the guiding rod 48. The piston 41 is equipped with a striking member 49 used to strike the nail and drive it outward. The power spring 42 is fitted around the outer circumference of the guiding rod 48, with one end abutting against the piston 41 and being compressed and storing energy under the action of the piston 41. Furthermore, a guide sleeve 4221 is also fitted around the outer circumference of the guiding rod, and this guide sleeve 4221 is located between the power spring 42 and the guiding rod 48.

As seen in FIG. 2, the fixed plate assembly comprises a front fixed plate 422 and a rear fixed plate 421, used for respectively fixing the front and rear ends of the guiding rod 48. An installation cavity inside the casing 21 has a slot structure. A front fixed plate 422 is fixed at the front end (in this embodiment, the front fixed plate 422 is plate-shaped), and a rear fixed plate 421 (also plate-shaped in this embodiment) is fixed at the rear end. A pair of parallel guiding rods 48 are disposed between the front fixed plate 422 and the rear fixed plate 421. The piston 41 is on the side of the guiding rods 48 closer to the front fixed plate 422, and the guiding rods pass through the piston 41 to affix to the front fixed plate 422 via one or more screws. A buffer pad 423 is disposed between the front fixed plate 422 and the piston 41 to cushion collisions during the piston's movement. As shown in FIG. 4, this embodiment has two parallel power springs 42, with the front end abutting the piston 41 and the rear end set against the rear fixed plate 421. Both power springs 42 are placed around the two guiding rods 48. One end of each guiding rod 48 is secured to the rear fixed plate 421 with a screw, and the other end passes through the piston 41 to fix onto the front fixed plate 422. The guiding rods 48 direct the piston 41 in its predetermined reciprocating movement.

In one embodiment, similarly, there are two guide sleeves 481, each of which is movably fitted around the outer periphery of the two guiding rods 48, located on the inside of the power spring, and the length of the guide sleeve 4221 is smaller than the length of the power spring 42 when it is compressed to a predetermined limit position (generally, the length of the guide sleeve is designed on the premise that the guide sleeve does not interfere with the piston when the piston moves to the predetermined limit position on the side facing the power spring, and longer guiding rods are generally used, which are greater than the length of the power spring after compression). This allows the power spring 42 to compress normally. In one embodiment, the guide sleeve 481 is cylindrical in shape with a small friction coefficient (typically made of materials such as nylon and polyoxymethylene, or similar materials can be used as replacements). It is located inside the power spring 42. When the power spring 42 is compressed or recovering, the guide sleeve can move along the compression or recovery direction on the guiding rod. The guide sleeve not only guides the power spring 42 but also prevents deformation of the power spring in other directions, reducing the wear of the power spring, extending its service life. Furthermore, it can reduce the friction when the power spring is compressed, making the compression process smoother.

The front end of the piston 41 is equipped with a striking member 49 to strike and shoot the nails. The rear end of the piston 41 interacts with the power spring 42. Driven by the power spring 42, it moves the piston 41 (i.e., the power spring 42 powers the movement of piston 41). The pushing component 43 has a pushing section directed towards the piston 41, which pushes the piston towards the end where the power spring 42 is located, thus compressing the spring for energy storage. Correspondingly, the piston 41 has a push-end that cooperates with the pushed-end, consisting of a first pushed-end 411 and a second pushed-end 412. The first pushed-end 411 extends from the piston 41 in the nail gun's striking direction, while the second pushed-end 412 extends towards the pushing component 43. The pushing section has a first pushing section 431 that interacts with the first pushed-end 411 and a second pushing section 432 that interacts with the second pushed-end 412. Both the first and second pushing sections, 431 and 432, are cylindrical in structure. As the pushing component 43 turns, it drives both the first and second pushing sections, 431 and 432, to turn. The diameter of the second pushing section 432 is smaller than that of the first pushing section 431, and its height is also shorter.

Figure 5:
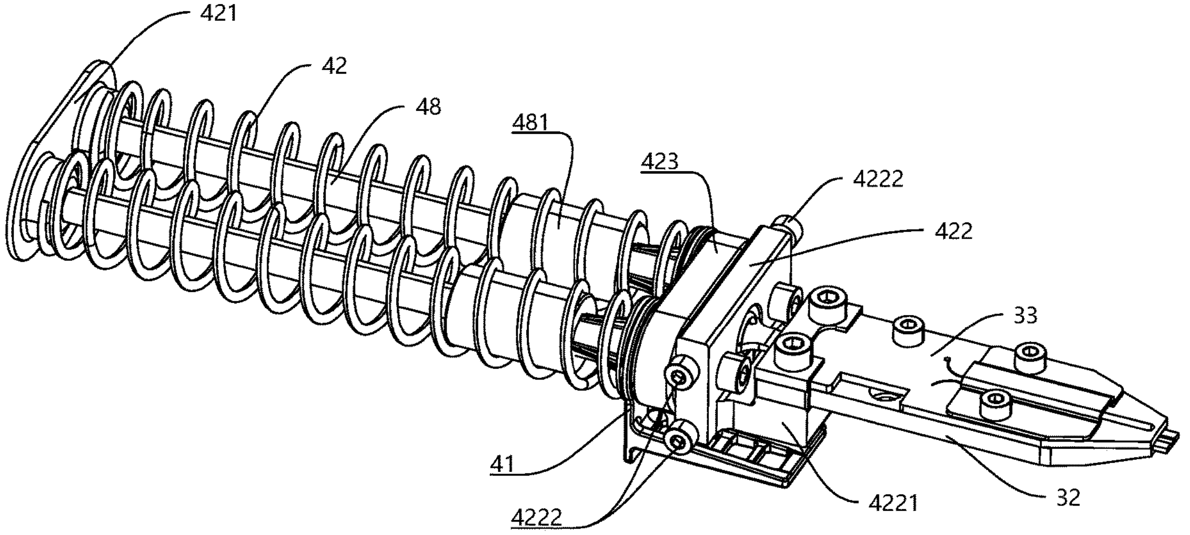
FIG. 5 is a schematic structural view of the muzzle mechanism according to one embodiment of the invention.

FIG. 5 is a schematic structural view of the muzzle mechanism according to one embodiment of the invention.

As shown in FIG. 5, in one embodiment, the front fixed plate 422 is positioned ahead of the piston 41 in the striking direction. Its lower end extends forward to form a mounting base plate 4221. The muzzle member 32 and the muzzle cover 33 are mounted above this mounting base plate 4221 using bolts. The front end of the striking member 49 in the middle of the piston 41 passes through the middle of the front fixed plate 422 and is inserted into the nail passage 34 between the muzzle member 32 and the muzzle cover 33. The left and right sides of the front fixed plate 422 are fixed to the casing 21 with mounting screws 4222.

Figure 6:
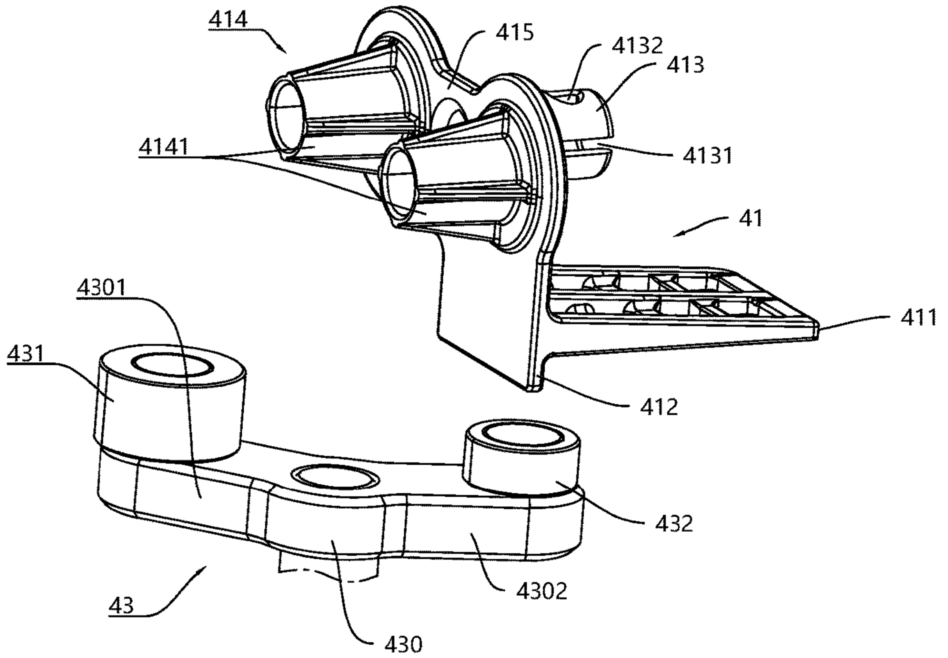
FIG. 6 is an exploded view of the piston and pushing component according to one embodiment of the invention.

FIG. 6 is an exploded view of the piston and pushing component according to one embodiment of the invention.

Figure 7:
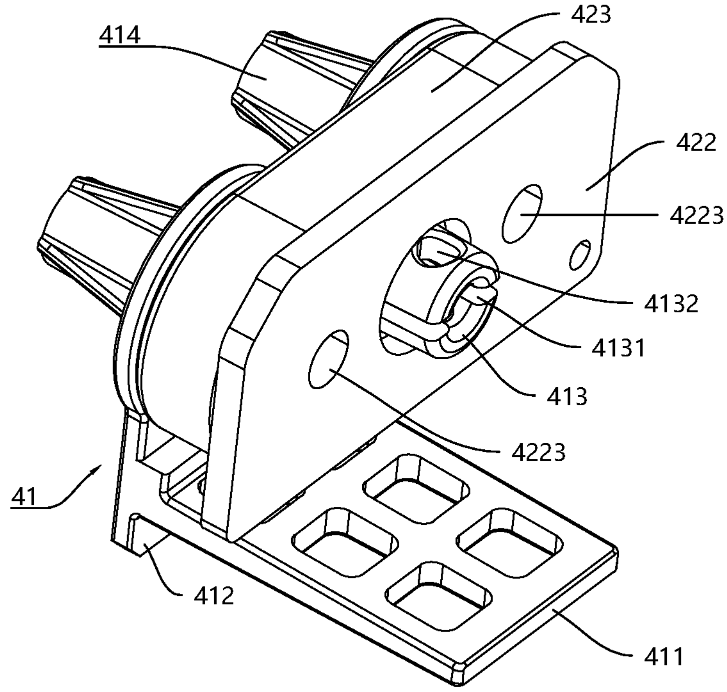
FIG. 7 is a schematic structural view of the piston and the cylinder head plate according to one embodiment of the invention.

FIG. 7 is a schematic structural view of the piston and the cylinder head plate according to one embodiment of the invention.

As shown in FIGS. 6 and 7, the piston 41 has a fixed part 413 used to secure the striking member 49. In one embodiment, the fixed part 413 as a whole is similar to a cylindrical shape, the middle of which has a straight slot 4131 axially and a fixing hole 4132 that passes radially through the entire cylinder. One end of the striking member 49 is inserted into the straight slot 4131 and is fixed in place using a pin that is inserted into the fixing hole 4132, thus fixing the striking member 49 onto the fixed part 413. The rear side of the fixed part 413 has an installation part 414 for installing the power spring 42. In one embodiment, this installation part 414 has two conical shaped installation seats 4141 set for the power spring.

As shown in FIGS. 6 and 7, the conical shape is specifically shaped with the middle part being cylindrical, and several triangular-shaped reinforcing structures are distributed on the outer periphery of the cylindrical part. The installation seat 4141 has a wider large end and a narrower small end. The middle part of the guide sleeve 481 is provided with a central hole through which the guiding rod 48 passes. The diameter of this central hole is smaller than the diameter of the small end, which prevents the guide sleeve 481 from getting stuck on the installation seat 4141 of the piston 41 during the movement of the guiding rod 48.

Both of the installation seats 4141, the front fixed plate 422, and the buffer pad 423 have through holes 4223. The front ends of the two guiding rods 48 are fixed to the front fixed plate 422 through the corresponding two through holes 4223.

The fixed part 413 is connected to the installation part 414 via a plate-shaped connection part 415. The lower end of the connection part 415 extends downward (in the direction of the pushing component 43) to form a second pushed-end 412. One side of the second pushed-end 412 extends in the direction of the fixed part 413 to form the first pushed-end 411, and the second pushed-end 412 is approximately perpendicular to the first pushed-end 411. As shown in FIG. 7, in another embodiment, the front fixed plate 422 is only a square plate-shaped structure, the muzzle mechanism is directly fixed to the casing 20, without the need to be fixed to the front fixed plate 422. Instead, the muzzle member 32 is bolted directly to the casing 20.

Both the first pushing section 431 and the second pushing section 432 have a cylindrical structure. The pushing component 43 also has a crank corner 430, which consists of a first crank arm 4301 and a second crank arm 4302. The first pushing section 431 is installed at the outer end of the first crank arm 4301, and the second pushing section 432 is installed at the outer end of the second crank arm 4302. Both the first crank arm 4301 and the second crank arm 4302 are of equal length, forming an angle between them, and both their outer ends are arc-shaped. The outer rim of the first pushing section 431 protrudes beyond the outer end of the first crank arm 4301, while the outer rim of the second pushing section 432 is either flush with or slightly indented relative to the outer end of the second crank arm 4302.

As shown in FIG. 4, the motor 44 includes a motor body 441 and a speed reducing mechanism 442. The speed reducing mechanism 442 is mounted on the output shaft of the motor body 441. The pushing component 43 is mounted on the output end of the speed reducing mechanism 442, and a one-way rotation component 45 is disposed between them. Under the drive of the motor body 441 and the speed reducing mechanism 442, the pushing component 43 rotates in one direction. The motor body 441 in this embodiment is a brushless motor. The speed reducing mechanism 442 is mounted on the output shaft of the motor body 441 to reduce the output speed of the motor body 441, thereby obtaining a higher output torque, i.e., a greater driving force. The one-way rotation component 45 restricts the rotation direction of the output end 443 of the motor 44 (i.e., the output shaft of the speed reducing mechanism 442), allowing it to rotate in only one direction. The one-way rotation component 45 is mounted on the output shaft of the speed reducing mechanism 442 and is synchronized to the output shaft, thus allowing the output shaft to rotate in only one direction. Meanwhile, when the pushing component 43 is subjected to a force that would cause it to rotate in the opposite direction, the one-way rotation component 45 bears this force, preventing it from being transmitted to the output shaft and thereby protecting the motor body 441. The specific structures of the motor body 441 and the speed reducing mechanism 442 adopt those found in existing technology. As shown in FIGS. 1, 2, and 4, the motor and the pushing component 43 are almost directly below the piston 41, making the whole structure more compact. The weight is concentrated in the middle of the entire nail gun, which compared to setting the motor and driving assemblys on the side, is more stable and evenly stressed and does not take up extra space.

During installation, a through hole is provided in the middle of the crank corner 430, located between the first crank arm 4301 and the second pushing section 432. The crank corner 430 is installed on the output end of the speed reducing mechanism 442 through this hole and can rotate with the motor body 441 and the speed reducing mechanism 442. Designing the pushing component 43 in the shape of the crank corner 430 is lighter compared to existing technologies that use structures like discs. This design not only saves materials but also reduces energy consumption, resulting in better transmission effects.

When the pushing component 43 rotates, its first pushing section 431 and second pushing section 432 will move in an arc with the crank corner 430 and will cooperate with the first pushed-end 411 and the second pushed-end 412 on the piston 41 to push the piston 41 in the energy storage direction. The shape and height of the first pushing section 431 correspond to the setting of the first pushed-end 411, and the shape and height of the second pushing section 432 correspond to the setting of the second pushed-end 412.

Figure 8:
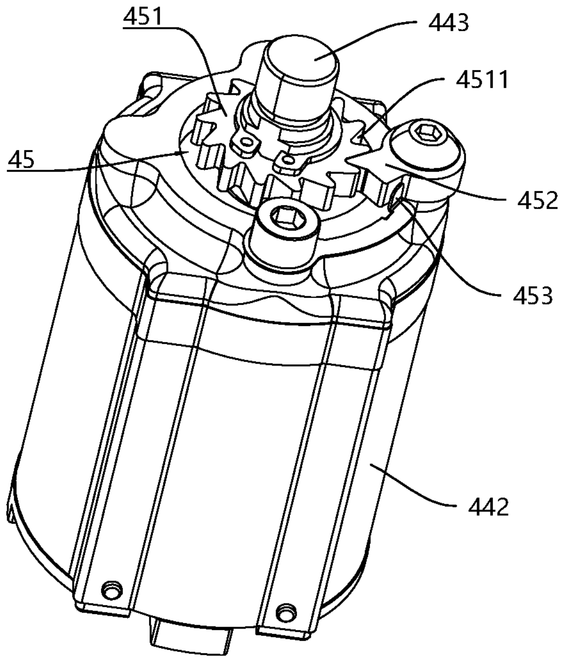
FIG. 8 is a schematic structural view of the one-way rotation component and the speed reducing mechanism according to one embodiment of the invention.

FIG. 8 is a schematic structural view of the one-way rotation component and the speed reducing mechanism according to one embodiment of the invention.

In one embodiment, the one-way rotation component can be a one-way bearing or a ratchet and pawl structure as shown in FIG. 8. The one-way bearing is a commonly used structure, so it won't be described in detail here. Instead, the present invention focuses on the ratchet and pawl structure in this embodiment. As shown in FIG. 8, the one-way rotation component 45 includes a ratchet 451, a pawl 452, and a pawl spring 453. The ratchet 451 is disposed on the output end 443 and has several ratchet teeth 4511. The pawl 452 is disposed on the speed reducer 442 next to the ratchet 451. The pawl 452 is used to insert between the teeth 4511 to make the ratchet 451 rotate in one direction. One end of the pawl spring 453 is fixed to the speed reducer 443 with a bolt, and the other end rests on the pawl 452, ensuring it always tends to move towards and insert into the teeth 4511.

Figure 9:
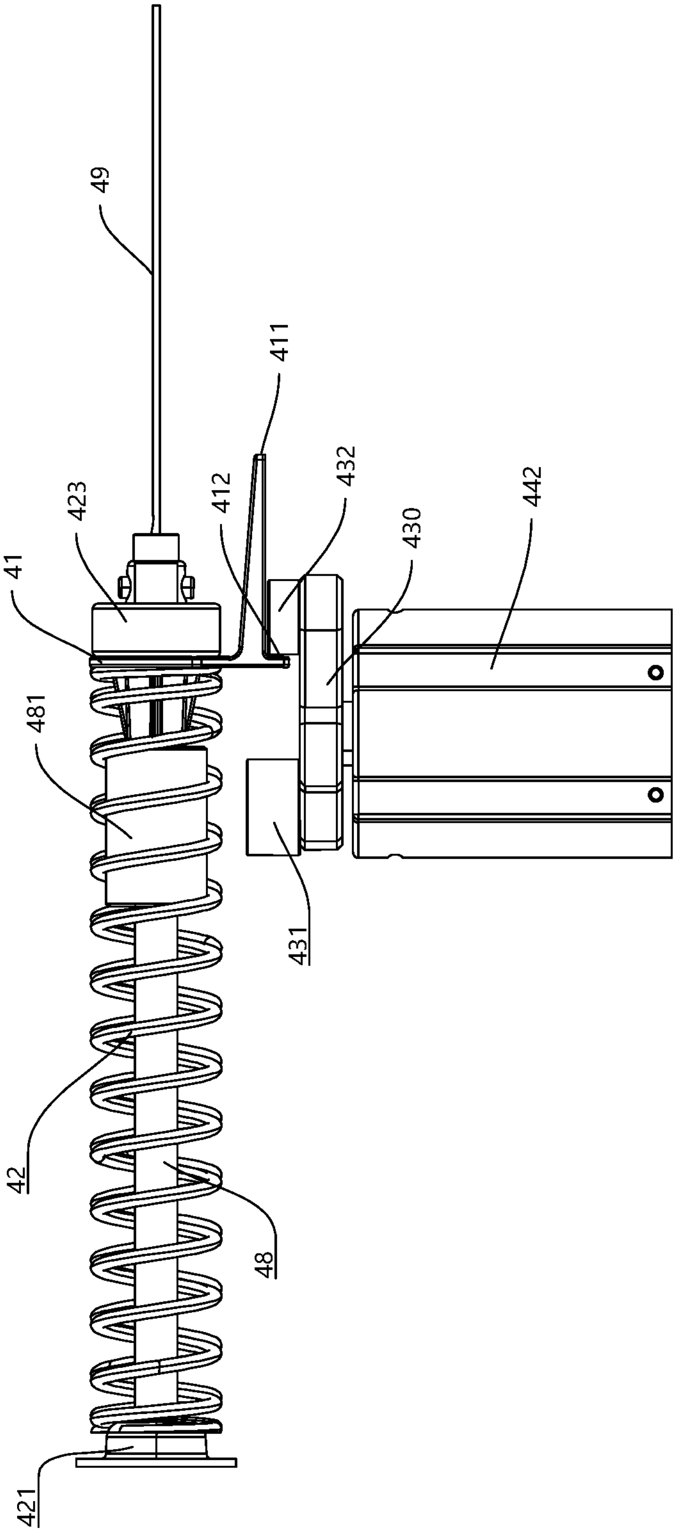
FIG. 9 illustrates a process the pushing component interacts and drives the piston at a first position according to one embodiment of the invention.

FIG. 9 illustrates a process the pushing component interacts and drives the piston at a first position according to one embodiment of the invention.

Figure 10:
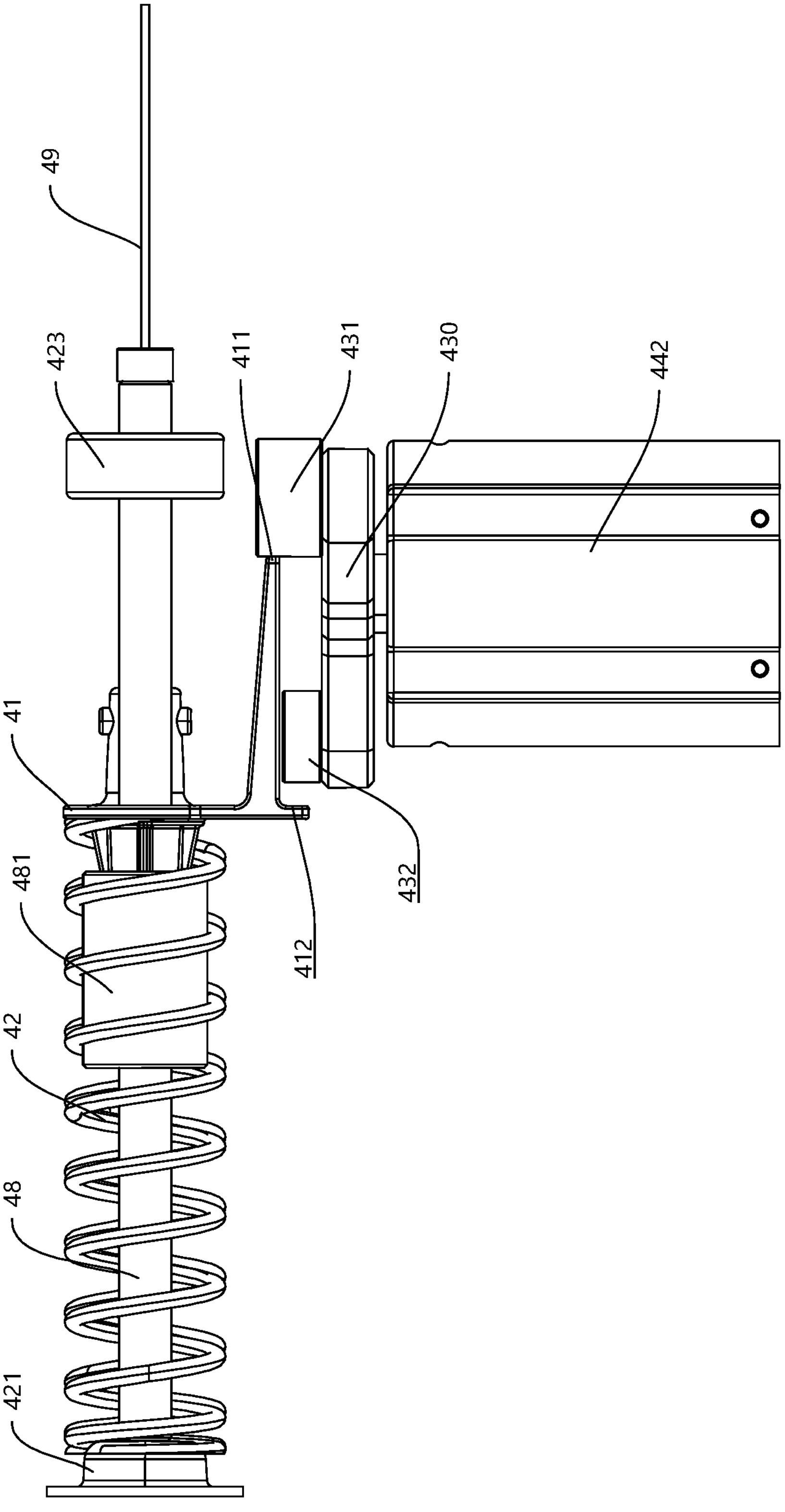
FIG. 10 illustrates a process the pushing component interacts and drives the piston at a second position according to one embodiment of the invention.

FIG. 10 illustrates a process the pushing component interacts and drives the piston at a second position according to one embodiment of the invention.

FIGS. 9 and 10 show the interaction between the energy storage mechanism 43 and the piston during the piston movement process. As depicted, under the drive of the motor body 441, the pushing component 43 rotates clockwise. With its rotation, the second pushing section 432 moves to the second pushed-end 412, and they get in contact with each other. The pushing component 43 continues to rotate, and the second pushing section 432 moves in an arc towards the energy storage direction, applying an arcing force to the piston 41 through the second pushed-end 412. This causes the piston 41 to move along the guiding rod 48 in the energy storage direction, compressing the power spring 42 for energy storage. When the second pushing section 432 rotates to its maximum stroke in the energy storage direction, the first phase of energy storage is completed. The pushing component 43 continues to rotate, with the second pushing section 432 subsequently disengaging from the second pushed-end 412. Simultaneously, the first pushing section 431 rotates to meet the first pushed-end 411. It then pushes the piston 41 further in the energy storage direction until the first pushing section 431 rotates to its maximum stroke, completing the second phase of energy storage and the entire spring energy storage process accomplished. In one embodiment, after the second phase of energy storage, nailing is carried out. During nailing, the motor body 441 drives the pushing component 43 to continue rotating, and the first pushing section 431 disengages from the first pushed-end 411. At this point, both the first and second pushed-ends are out of the piston's path, allowing the piston 41 to move in the nail striking direction under the force of the power spring 42. This continues until the striking member 49 hits the nail, completing the nailing process. During the above-mentioned first or second phase of energy storage, the crank corner 430, due to the one-way bearing, will not rotate in reverse under the force of the piston 41, preventing accidental striking of the nails.

The motor body 441 drives the pushing component 43, which in turn pushes the piston 41. This action causes the power spring 42 to be compressed for energy storage, and finally, the piston 41 is pushed out under the force of the power spring 42.

Figure 11:
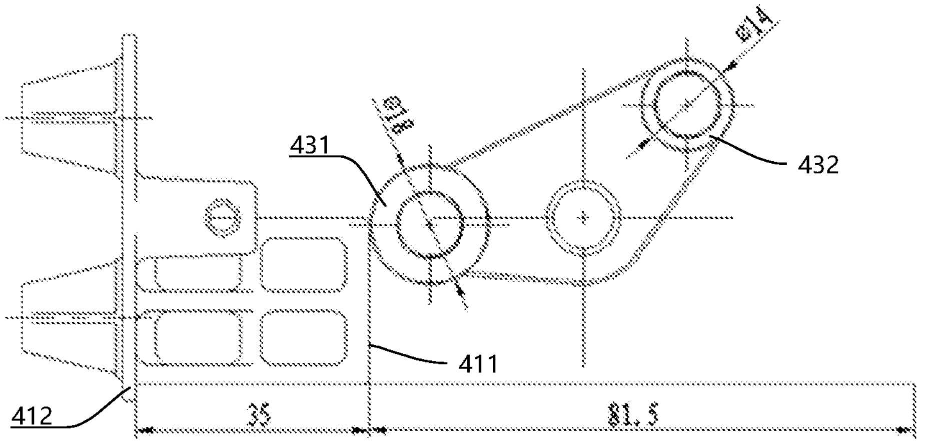
FIG. 11 is a cross section view of the piston and the pushing component in contact with each other according to one embodiment of the invention.

FIG. 11 is a cross section view of the piston and the pushing component in contact with each other according to one embodiment of the invention.

Figure 12:
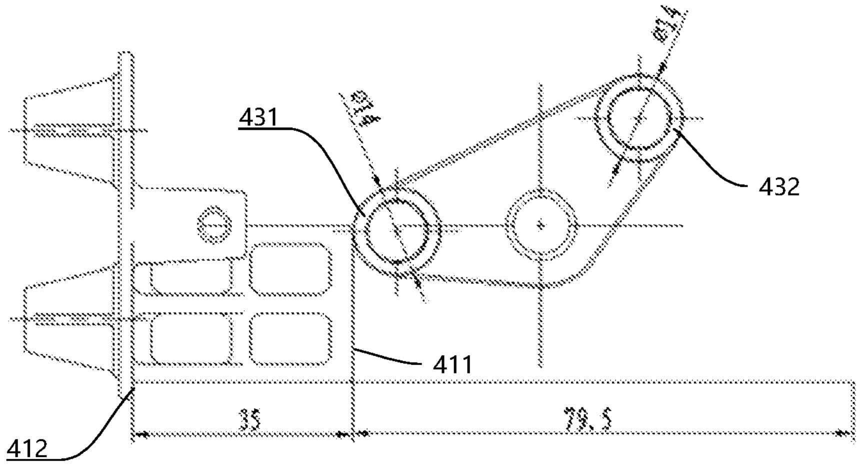
FIG. 12 is a cross section view of the piston and the pushing component in contact with each other according to a control design.

FIG. 12 is a cross section view of the piston and the pushing component in contact with each other according to a control design.

In this embodiment, both the first pushing section 431 and the second pushing section 432 are cylindrical. The external diameter of the second pushing section 432 is designed to be smaller than that of the first pushing section 431, and they are not equal. This design can enlarge the piston's stroke compared to having equal external diameters. An experiment showed in FIGS. 11-12, in this embodiment, the external diameter of the first pushing section 431 is 18 mm (radius 9 mm), and the external diameter of the second pushing section 432 is 14 mm (radius 7 mm). The distance between the first pushed-end 411 and the second pushed-end 412 of the piston is 35 mm, and the experimental working stroke achieved is 81.5 mm. In contrast, as shown in FIG. 12, in the control group of this embodiment, the external diameters of the first pushing section 431 and the second pushing section 432 are both 14 mm (radius 7 mm). The distance between the first and second pushed-ends of the piston is 35 mm, and the experimental working stroke achieved is 79.5 mm, clearly less than the stroke achieved in this embodiment.

The calculations for the above work mode are as follows.

The working stroke is represented as S. The distance between the first pushed-end and the second pushed-end of the piston is L. The angle between the first pushing section 431 and the second pushing section 432 is denoted as n (that is, the angle between the first crank arm 4301 and the second pushing section 432). The formula for calculating the arc length traversed by the rotation of the first pushing section 431 and the second pushing section 432 is: $1=n\pi R/180°$. When the first pushing section 431 and the second pushing section 432 have the same diameter (both with a radius of R), the working stroke of the piston is $S=L+1=L+)(n\pi R/180°$. When the first pushing section 431 and the second pushing section 432 have different diameters (with radii R1 and R2 respectively), the working stroke is $S=L+1+(R1-R2)$. It is evident that when the diameters are not equal, the piston's working stroke is longer by a distance of (R1−R2) compared to when the diameters are equal. This means that by adjusting the diameter of the pushing section without changing the length of the piston's pushed-ends, it is possible to achieve the maximum working stroke. The greater the working stroke, the more the power spring 42 is compressed, thereby obtaining a greater energy, allowing for a more forceful and rapid striking of the nail. Additionally, since the nail gun structure needs to be compact, it is ideal to minimize the design length of the nail gun, which is also beneficial for operation, packaging, and transportation.

As shown in FIG. 2, the energy storage mechanism 40 also includes a control assembly, which includes a main switch 46 and a safety switch 47. They are connected in series to the lithium battery 60 and the motor body 441. When both the main switch 46 and the safety switch 47 have an electric signal, the motor body 441 can be controlled to operate. The main switch 46 is a button-type switch with a pressing part 461 and a main switch component 462. The main switch component 462 can generate a corresponding startup electric signal when the pressing part 461 is pressed. The safety switch 47 is a linkage-type switch with a toggle part 471 and a safety switch component 472. The safety switch component 472 can generate an electric signal when it contacts the toggle part 471. In this embodiment, both the main switch component 462 and the safety switch component 472 use microswitches. When both components generate an electric signal, the motor body 441 operates, driving the pushing component 43 to rotate and complete the aforementioned spring energy storage process.

Figure 13:
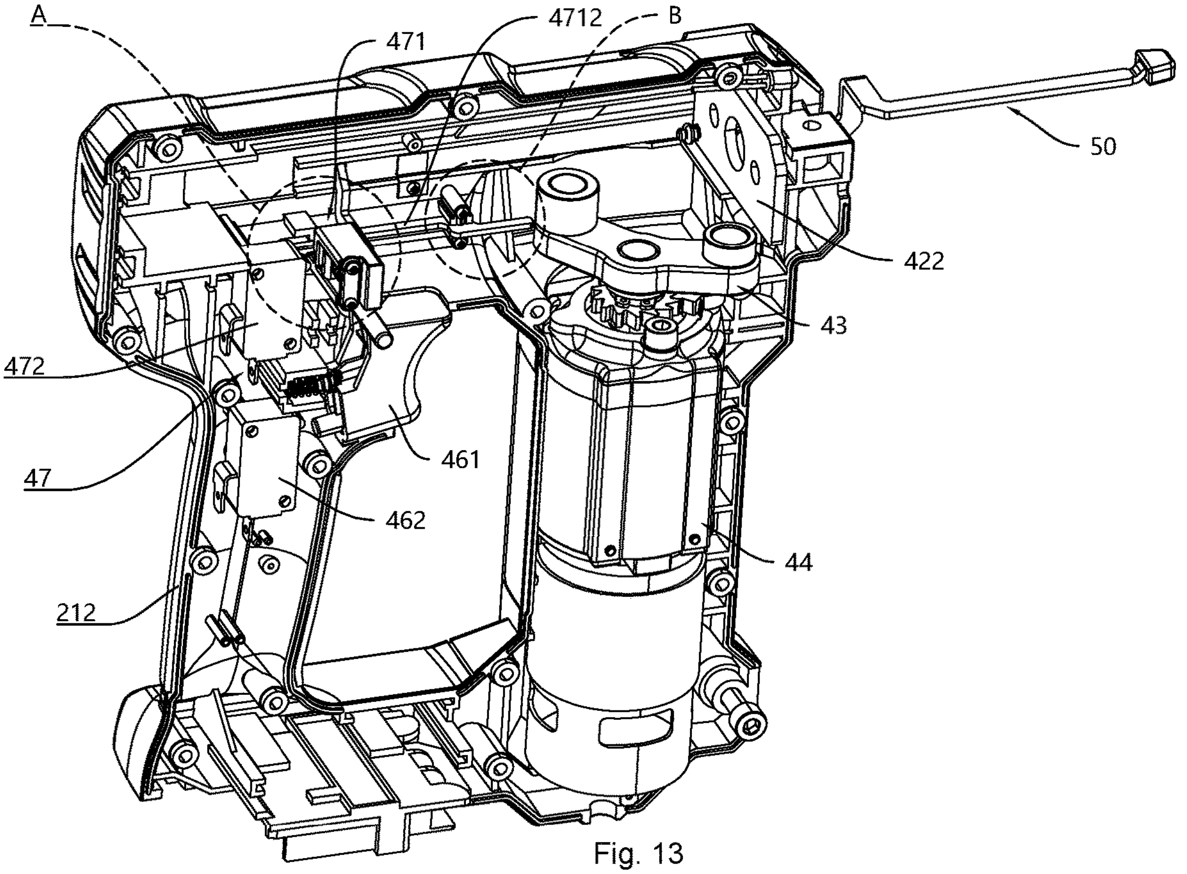
FIG. 13 is a schematic structural view of a safety switch installed inside the casing according to one embodiment of the invention.

FIG. 13 is a schematic structural view of a safety switch installed inside the casing according to one embodiment of the invention.

Figure 14:
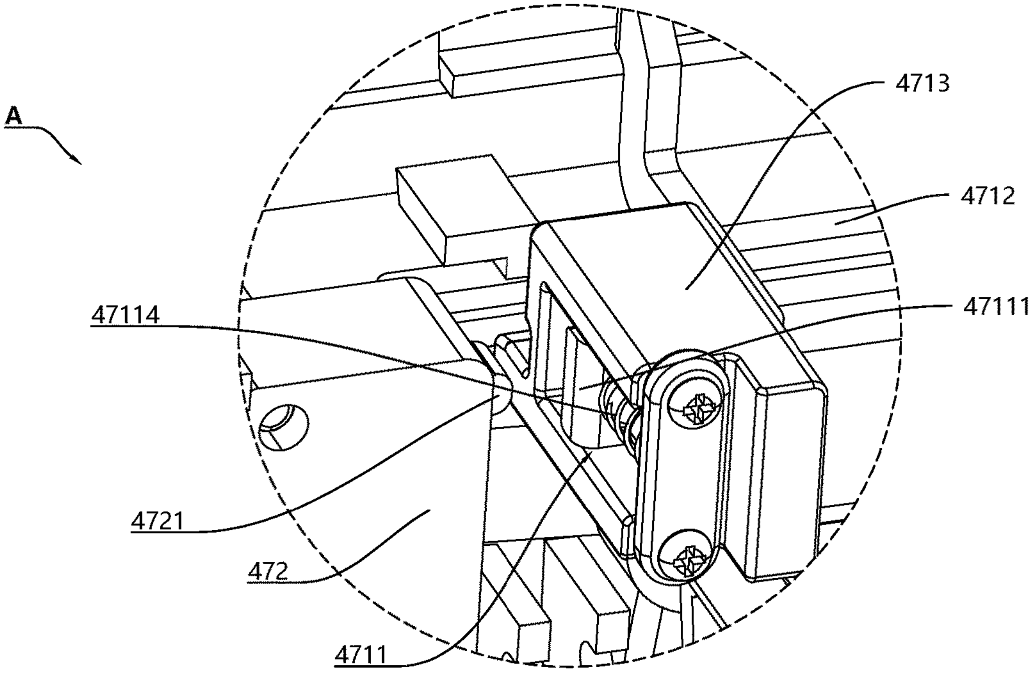
FIG. 14 is an enlarged view of the part A in FIG. 13.

FIG. 14 is an enlarged view of the part A in FIG. 13.

Figure 15:
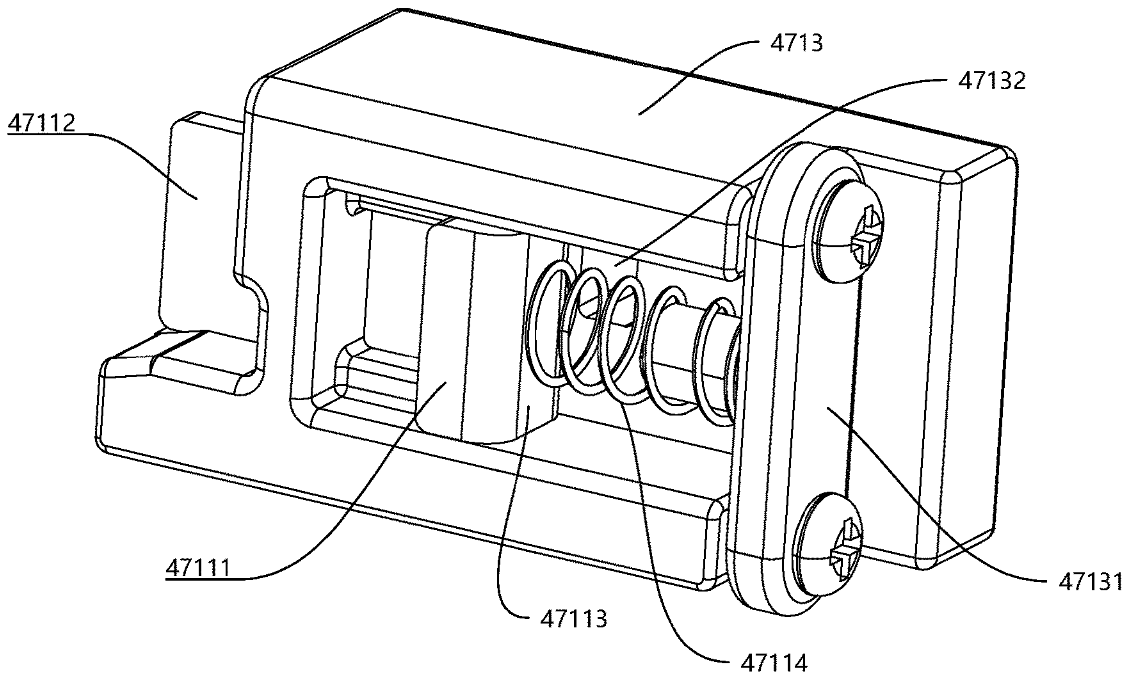
FIG. 15 is a schematic structural view of the toggle part installed inside the toggle base according to one embodiment of the invention.

FIG. 15 is a schematic structural view of the toggle part installed inside the toggle base according to one embodiment of the invention.

Figure 16:
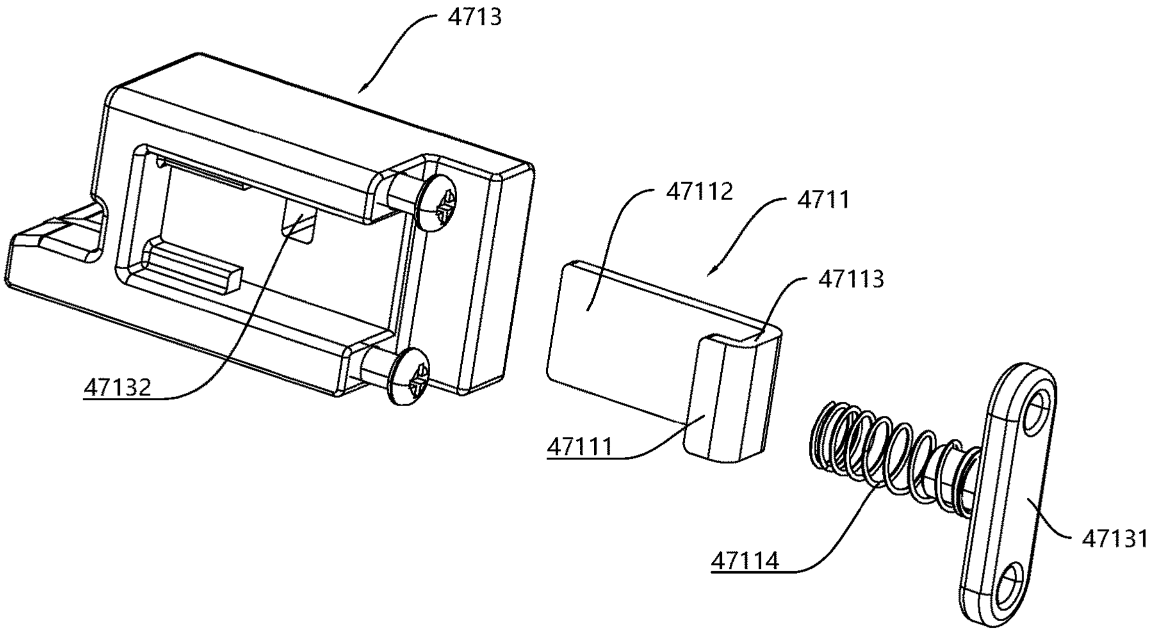
FIG. 16 is an exploded view of the toggle part and the toggle base according to one embodiment of the invention.

FIG. 16 is an exploded view of the toggle part and the toggle base according to one embodiment of the invention.

As shown in FIGS. 13, 14, -16, the toggle part 471 of the safety switch 47 consists of a toggle blade 4711, a toggle rod 4712, and a toggle blade seat 4713 for mounting the toggle blade 4711. The toggle blade 4711 is on one side of the safety switch component 472 and interacts with it. The interaction mode is such that one side of the safety switch component 472 has an activation point 4721. The toggle blade 4711, in a hook shape, is mounted on the toggle blade seat 4713 and comprises a contact plate 47111, a toggling plate 47112, and a connecting plate 47113 that connects the contact plate 47111 with the toggling plate 47112. The contact plate 47111 is disposed to face the activation point 4721 of the safety switch component 472 for contact. When the activation point 4721 contacts the contact plate 47111, an electrical signal will be generated in the safety switch component. The outer end of the toggling plate 47112 extends out of the toggle blade seat 4713 to contact the toggle rod 4712. The length of the contact plate 47111 is shorter than that of the toggling plate 47112, resulting in a gap. When pushed by the toggle rod 4712, the toggling plate 47112 will move towards the toggle blade seat 4713, causing the contact plate 47111 to move and gradually separate from the activation point 4721. When the activation point 4721 is in the gap, the safety switch component 472 will break the electrical connection. To reset the toggle blade 4711, a toggle spring seat 47131 is disposed on the toggle blade seat 4713. A toggle blade reset spring 47114 is installed against the connecting plate 47113 of the toggle blade 4711.

Figure 17:
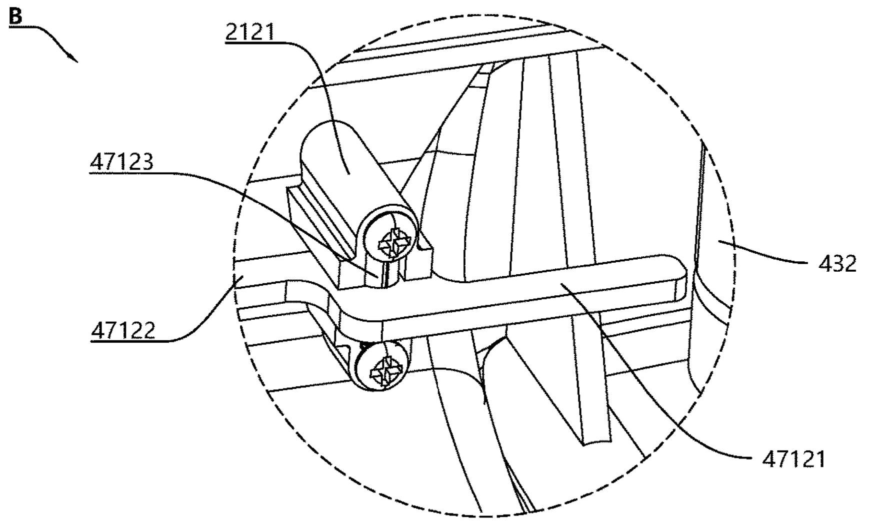
FIG. 17 is an enlarged view of the part B in FIG. 13.

FIG. 17 is an enlarged view of the part B in FIG. 13.

The toggle rod 4712 is a long rod bent at one end and is used to control the movement of the toggle blade 4711. Specifically, the toggle rod 4712 includes a first toggle rod 47121 and a second toggle rod 47122. The end of the first toggle rod 47121 is set near the pushing section of the driving assembly 43 and will collide (scrape) during the rotation of the pushing section. The end of the second toggle rod 47122 is on the inside of the toggle blade 4711. The connection section where the first toggle rod 47121 and the second toggle rod 47122 are joined has a toggle pin 47123. A protrusion inside the rear cover plate 212 of the casing 20 provides a toggle rod installation position 2121 for the toggle pin 47123. The toggle rod 4712 is rotatably mounted at the toggle rod installation position 2121 through this toggle pin 47123. In this embodiment, the first toggle rod 47121 and the second toggle rod 47122 are staggered, meaning they are not in line. The entire toggle rod 4712 is Z-shaped. The length of the first toggle rod 47121 is shorter than the second toggle rod 47122. Using the lever principle, once the first toggle rod 47121 is scraped by the pushing section, the second toggle rod 47122 will rotate in the opposite direction, touching and pushing the toggle blade 4711. This staggered design allows the first toggle rod 47121 to have enough space during rotation and ensures the second toggle rod 47122 can obtain the required stroke when pushing the toggle blade 4711.

Figure 18:
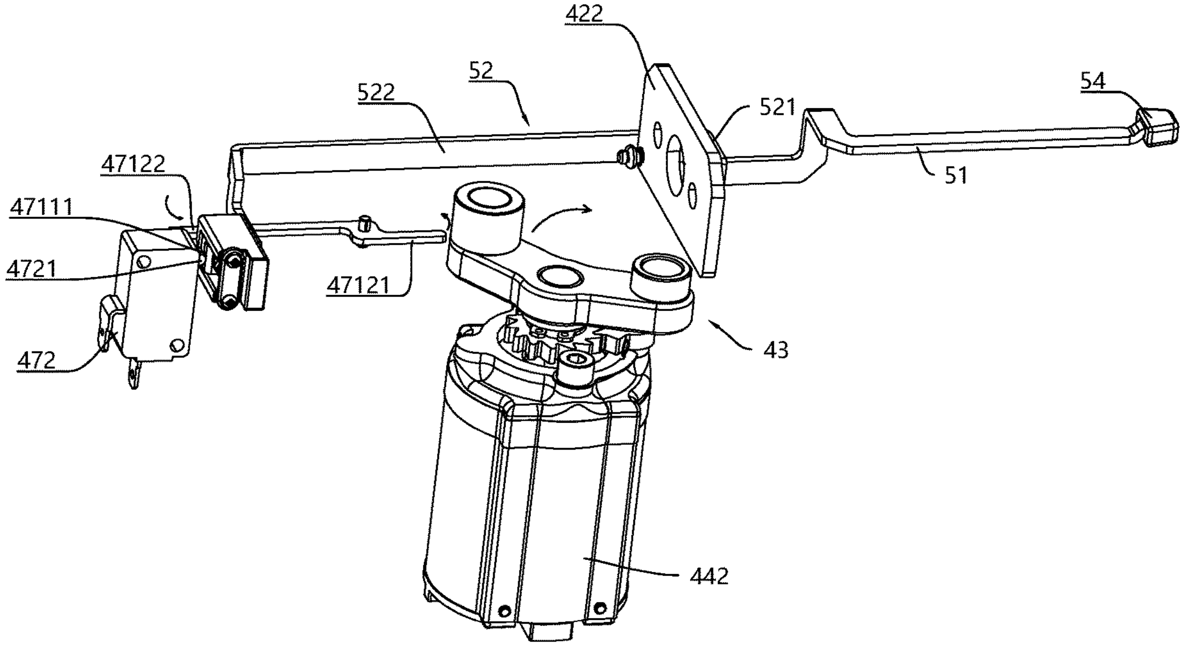
FIG. 18 is one of the schematic diagrams showing the installation position of the safety switch and the crank mechanism according to one embodiment of the invention.

FIG. 18 is one of the schematic diagrams showing the installation position of the safety switch and the crank mechanism according to one embodiment of the invention.

As shown in FIG. 18, at this time, the safety switch component 472 is in a state with an electrical signal, i.e., the activation point 4721 contacts the contact plate 47111 of the toggle blade 4711. When the pushing section of the driving assembly 43 rotates clockwise, once it scrapes the first toggle rod 47121, it will cause the first toggle rod 47121 to rotate inward. According to the lever principle, the second toggle rod 47122 will rotate outward, touch the toggling plate 47112 of the toggle blade 4711, and push the toggle blade 4711 to move outward. This will cause the contact plate 47111 to leave the activation point 4721. At this time, the safety switch component 472 will disconnect the electrical signal, and the drive motor will immediately stop working.

Because there is a toggle reset spring 47114 between one side of the toggle blade 4711 and the toggle blade seat 4713, when there is no contact between the pushing section and the first toggle rod 47121, the toggle reset spring 47114 will push the toggle blade 4711 back to its original position. The first toggle rod 47121 and the second toggle rod 47122 will also reset in sequence. The outer side of the first toggle rod 47121 can be set with an inclined guiding surface 471211, making it more convenient for the pushing section to collide with the first toggle rod 47121 during rotation.

Figure 19:
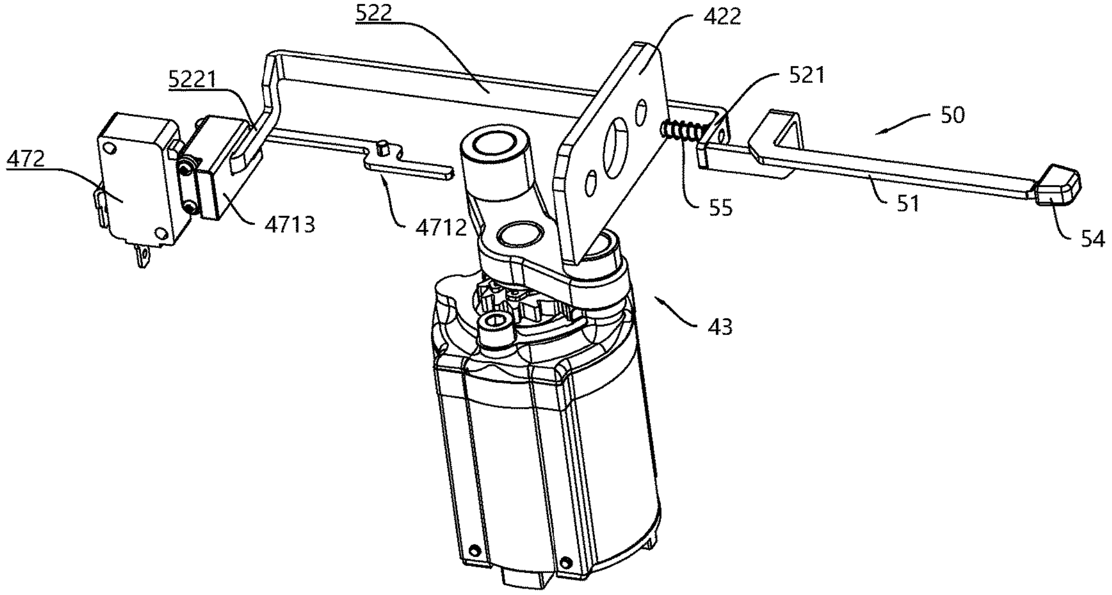
FIG. 19 is a second schematic diagram showing the installation position of the safety switch and the crank mechanism according to one embodiment of the invention.

FIG. 19 is a second schematic diagram showing the installation position of the safety switch and the crank mechanism according to one embodiment of the invention.

The energy storage mechanism 40 includes a crank assembly 50, which is designed to promote the linkage between the toggle blade 4711 and the safety switch component 472. The crank assembly 50 includes an outer crank 51 and an inner crank 52. As depicted in FIGS. 1 and 2, the external end of the crank 51 extends out of the casing 20 and is attached to the muzzle cover plate 33 of the muzzle mechanism via a pressure plate 53. The external end protrudes from the muzzle mechanism, and the internal end of the outer crank 51 is linked with the inner crank 52 inside the casing 20. As shown in FIGS. 18 and 19, the inner crank 52 has a short section 521 and a long section 522, set perpendicular to each other. The external side of the short section 521 contacts the internal end of the outer crank 51. The long section 522 extends near the toggle blade seat 4713 and bends towards the toggle blade seat 4713, forming a contact section 5221. The toggle blade seat 4713 has a hole 47132 into which the end of the contact section 5221 is inserted, connecting it with the toggle blade seat 4713.

The linkage between the crank assembly 50 and the safety switch component 472 works as follows.

During the nail gun's use, the muzzle mechanism, located at the front, is first aligned with the target area to be nailed.

Since the external end of the crank 51 protrudes from the muzzle mechanism, when it touches the target area, it generates a reactionary force on the outer crank 51, causing it to move toward the side of the nail gun. The internal end of the outer crank 51 will touch the short section 521 of the inner crank 52, pushing the inner crank 52 inward. As the outer crank 51 moves, it also drives the toggle blade seat 4713 towards the safety switch component 472. This causes the contact plate 47111 on the toggle blade 4711 inside the toggle blade seat 4713 to touch and press the activation point 4721 of the safety switch component 472, generating an electrical signal. Then, when the user presses the pressing section 461, the main switch component 462 is activated, creating another electrical signal. When both switch components are activated, the motor body 441 starts, allowing the power spring to store energy before striking the nail.

As shown in FIG. 19, a crank reset spring 55, designed to reset the crank assembly, is positioned between the short section 521 of the inner crank 52 and the front fixed plate 422. After nailing is complete and the user removes the nail gun, the external end of the outer crank 51 separates from the target area. At this point, the crank reset spring 55 drives both the inner crank 52 and the outer crank 51 to reset. The external end of the outer crank 51 also has a protective cover 54, which when in contact with the target area, reduces wear on the external end of the crank 51, extending its lifespan.

Working Principle of Embodiment 1-1

When using the nail gun, the front-facing muzzle mechanism is first aligned with the target nailing area. The outer crank 51 is pushed, causing the inner crank to drive the toggle blade seat toward the safety switch component 472, activating it to produce an electrical signal. Then, the user activates the main switch component 462 to create another electrical signal. At this point, since both the main and safety switches generate electrical signals, the motor body 441 starts, driving the drive component 43 to rotate. The drive component 43, during its rotation, causes the piston 41 to move toward the power spring 42, compressing it and storing energy in two stages. After the second energy storage stage is complete, nailing can commence. During nailing, the motor body 441 continues to drive the drive component 43 to rotate. The first drive end 431 rotates, disengaging from the first pushed-end 411. At this point, both the first pushing section 431 and the second pushing section 432 are outside the movement path of the piston 41. The piston 41, under the force of the power spring 42, moves in the direction of nailing until the striking member 49 strikes the nail, shoot it out, completing the nailing process. Simultaneously, because the outer rim of the first pushing section 431 protrudes, as it rotates, it will scrape against the first toggle rod 47121, prompting the first toggle rod 47121 to rotate inward. This pushes the second toggle rod 47122 outward, touching the toggle blade 4711 and moving it outward, causing the contact plate 47111 to separate from the activation point 4721.

Embodiment 1-2

Figure 20:
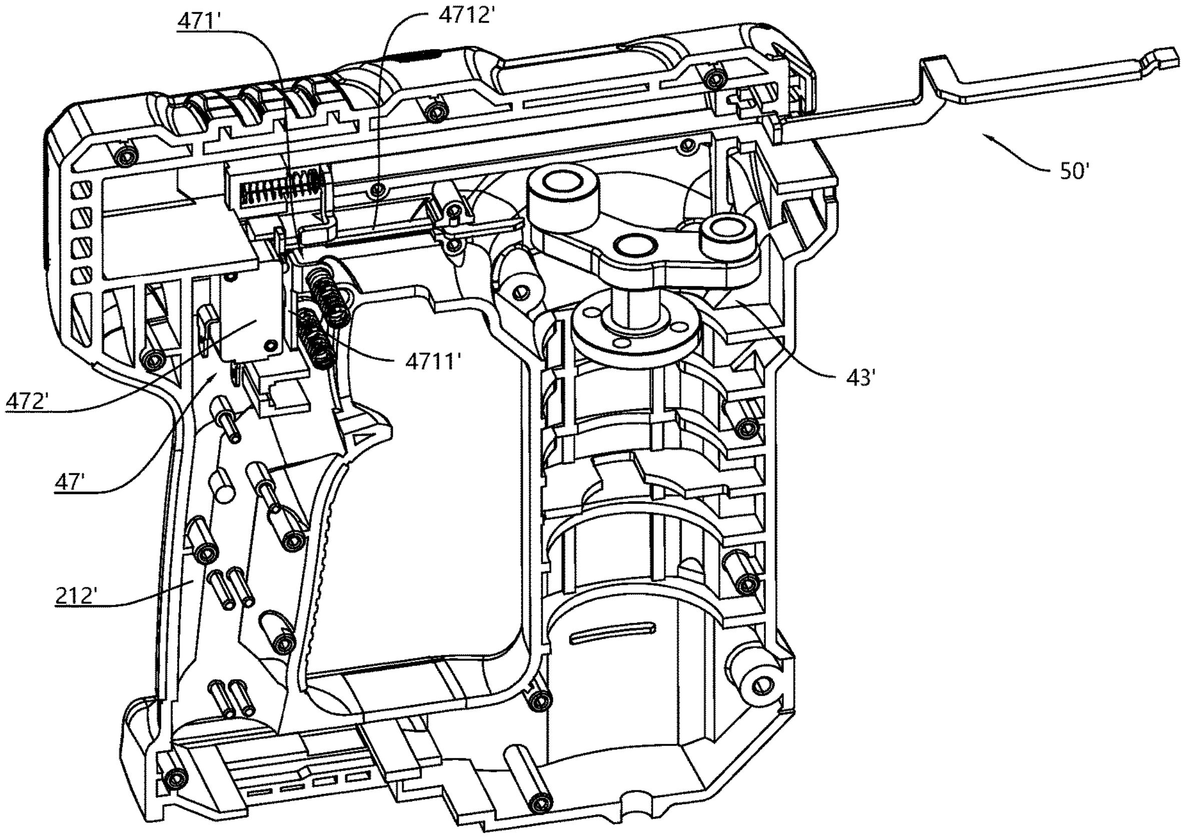
FIG. 20 is a schematic structural view of the safety switch installed inside the casing according to another embodiment of the invention.

FIG. 20 is a schematic structural view of the safety switch installed inside the casing according to another embodiment of the invention.

Figure 21:
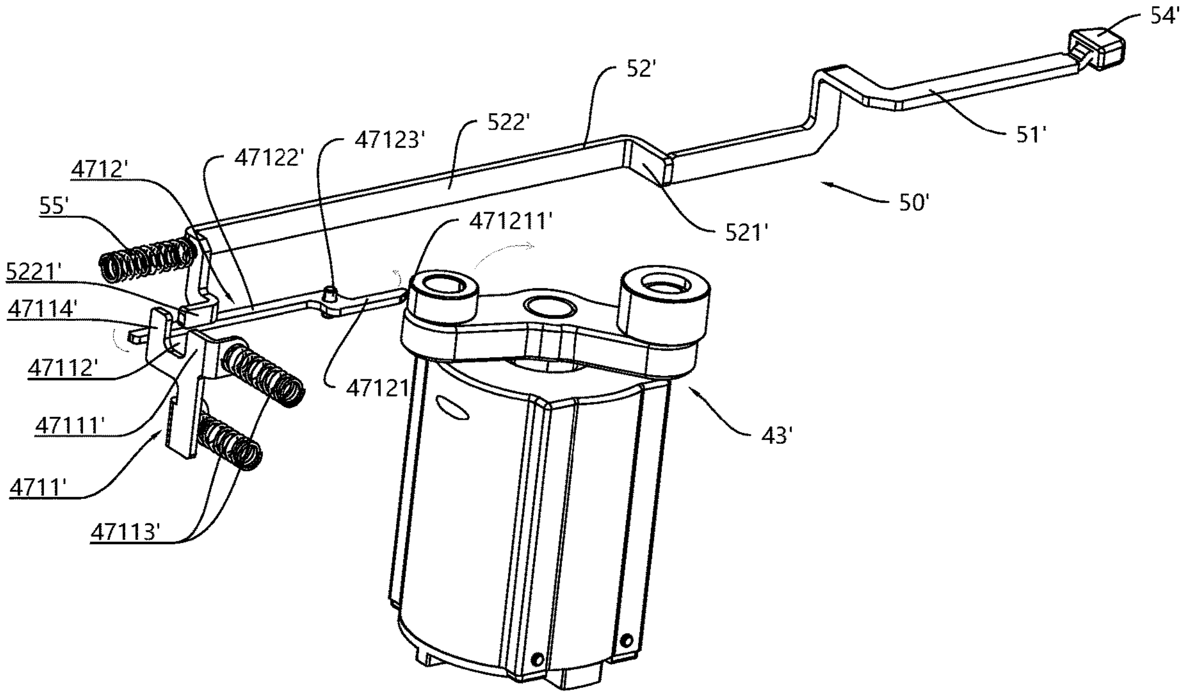
FIG. 21 is a schematic structural view showing the installation position of the safety switch and the crank mechanism according to another embodiment of the invention.

FIG. 21 is a schematic structural view showing the installation position of the safety switch and the crank mechanism according to another embodiment of the invention.

As shown in FIG. 20, the toggle part 471' of safety switch 47' includes a toggle blade 4711' and a toggle rod 4712'. The toggle blade 4711' is located on one side of the safety switch component 472' and is linked to it. The linking method is as follows: One side of the safety switch component 472' has a protruding switch 4721'. On the toggle blade 4711', there is a trigger end 47111'. When the trigger end 47111' touches the protruding switch 4721', it triggers the safety switch component 472' to open and produce an electric signal. Next to the trigger end 47111', there's a trigger slot 47112'. When the toggle blade 4711' moves, the trigger end 47111' departs from the protruding switch 4721', and once the protruding switch 4721' aligns with the trigger slot 47112', the safety switch component 472' disconnects the electric signal.

As shown in FIG. 21, the toggle rod 4712' is a long rod with one bent end, used to control the movement of the toggle blade 4711'. Specifically, the toggle rod 4712' has a first toggle rod 47121' and a second toggle rod 47122'. The end of the first toggle rod 47121' is close to the pushing component 43' and will collide with it during rotation. The end of the second toggle rod 47122' is located on the inner side of the toggle blade 4711'. The connecting section between the first and second toggle rods has a toggle pin 47123'. The rear cover 212' of the casing has a protruding section where the toggle pin 47123' is installed. The toggle rod 4712' is pivotally mounted at this location. (The structure of the toggle rod and its installation in the casing is the same as in Embodiment 1-1).

As shown in FIG. 21, when the pushing section of the pushing component 43' rotates clockwise and scrapes against the first toggle rod 47121', it prompts the first toggle rod 47121' to turn inward, causing the second toggle rod 47122' to push outward, touching the toggle blade 4711'. This moves the toggle blade 4711' outwards, making the trigger end 47111' leave the protruding switch 4721', disconnecting the safety switch component 472'. There's a toggle reset spring 47113' between the outer side of the toggle blade 4711' and the casing. When there's no contact between the pushing section and the first toggle rod 47121', the toggle reset spring 47113' pushes the toggle blade 4711' inward to reset, and both the first and second toggle rods also reset sequentially. An inclined guiding surface 471211' is on the outside of the first toggle rod 47121', facilitating a collision with the pushing section during rotation.

The energy storage mechanism 40 also includes a crank assembly 50', which is used to push the toggle blade 4711' to link with the safety switch component 472'. The crank assembly 50' consists of an outer crank 51' and an inner crank 52'. The external end of the crank 51' extends out of the casing 20 and protrudes from the muzzle mechanism. The internal end of the outer crank 51' links with the inner crank 52'. As shown in FIG. 21, the inner crank 52' has a short section 521' and a long section 522' set perpendicular to each other. The external side of the short section 521' touches the internal end of the outer crank 51'. The long section 522' extends near the toggle blade 4711' and bends towards it to form a contact section 5221'. Near the contact section 5221' on the toggle blade 4711', there's a contact plate 47114'. The slot 47112' is between the contact plate 47114' and the trigger end 47111'. Beside the contact section 5221', there's a crank reset spring 55'.

In one embodiment, the interaction between the crank assembly and the safety switch component 472' is as follows.

When using the nail gun, first align the front muzzle mechanism with the target area to be nailed. Since the external end of the crank 51' protrudes from the muzzle mechanism, when its external end touches the target, it generates a reaction force on the outer crank 51', causing it to move towards the nail gun side. The internal end of the outer crank 51' will touch the short section 521' of the inner crank 52', thus pushing the inner crank 52' inward. During this movement, the contact section 5221' will touch the contact plate 47114' on the toggle blade 4711', and press the toggle blade 4711' towards the safety switch component 472', causing it to open and generate an electric signal. Then, when the user presses the pressing part 461', it triggers the main switch component 462' to produce an electric signal. When both switches are open, the motor starts, the force spring starts to store energy, and then strike out the nail, completing the nailing process. After nailing, when the external end of the outer crank 51' separates from the target, the crank reset spring 55' will reset both the inner crank 52' and the outer crank 51'. Similar to Embodiment 1-1, there's also a protective cover 54' on the external end of the outer crank 51'. By touching the target with the protective cover 54', it reduces wear on the external end of the outer crank 51', prolonging its lifespan.

Effects and Functionality of the Embodiment

According to the energy storage mechanism for nail striking in the above-described embodiment, due to the placement of the guide sleeve 481 between the guiding rod 48 and the power spring 42, the guide sleeve 481 not only serves to guide the movement direction of the power spring 42, preventing the power spring 42 from bending and deforming in other directions during contraction but also reduces wear and friction of the power spring 42 during movement. This results in a longer service life for the power spring 42, smoother contraction, and a quicker energy storage process.

Based on the energy storage mechanism and the nail gun of the aforementioned embodiment, because the safety switch 47's toggle part 471 includes a toggle blade 4711, a toggle rod 4712, and a toggle blade seat 4713, the use of the mutual linkage between the toggle blade 4711, toggle rod 4712, toggle blade seat 4713, and the pushing component 43 serves to switch off the electrical signal of the safety switch 47. This belongs to a mechanical control method, eliminating the need for an additional controller, thereby saving costs and ensuring more stable operation.

In the energy storage mechanism and the nail gun of the aforementioned embodiment, since there's a pushing component 43, and this pushing component 43 directly cooperates with the piston 41 to push the piston 41 towards the force spring 42, thus allowing the force spring 42 to compress and store energy. The pushing component 43 has no direct contact with the striking member 49, avoiding any interference with the movement of the piston 41 due to contact with the striking member 49. This makes the entire energy storage process smoother and more stable.

Additionally, the pushing component 43 has a pushing section facing the piston 41, which contacts the pushing end on the piston 41 during its rotation to facilitate piston movement. This pushing section has both a first pushing section 431 and a second pushing section 432, allowing for both first-stage and second-stage energy storage, maximizing the energy storage capability of the force spring 42. Furthermore, the outer diameters of the first pushing section 431 and the second pushing section 432 are different, allowing for the maximum possible piston 41 movement without changing the length of the pushing end of the piston 41. The greater the working travel, the more the force spring 42 is compressed, hence greater energy can be obtained, and nails can be shot out more powerfully and quickly.

In this embodiment, the pushing component 43 is designed in the shape of a crank corner 430, which, compared to existing technologies like discs, is more lightweight, saving material, reducing energy consumption, and achieving better transmission results.

According to the energy storage mechanism provided in this embodiment, there is also a control assembly, which includes the main switch 46 and the safety switch 47. These two switches are connected in series and connected to the drive motor. Thus, the nail gun 10's motor body 441 can be directly controlled based on the nail-striking electrical signals and safety signals generated by the main switch 46 and safety switch 47. Since the main switch 46 and safety switch 47 are set in series, the motor body 441 can only start when both signals are received and valid, enabling nailing. With the energy storage mechanism adopting a dual-switch, double-insurance design, the safety during the nailing process is also ensured.

Furthermore, through this energy storage mechanism, the nail gun 10 can activate the safety switch through the crank mechanism when it touches the target location. And when the main switch 46 is pressed, i.e., at startup, it automatically begins to store energy and maintains a fully charged state, making the nailing process extremely convenient for the user with just a single button press.

The aforementioned embodiment is just an example to illustrate the specific implementation method of this invention, and the scope of this invention is not limited to the description of the above embodiment.

For instance, during the implementation process, the one-way rotation component at the output end of the drive motor can be replaced with a one-way bearing instead of a ratchet and pawl structure to achieve the same purpose.

Embodiment 2

In addition to the aforementioned Embodiment 1, the Embodiment 2 provides a striking mechanism, which is installed in a nail gun with a casing and is used to strike the nails from the nail gun's muzzle mechanism. It comprises the following features: a piston, movably disposed within the casing; a striking member, detachably mounted on the piston for striking the nails. The piston has a fixed part on the side facing the muzzle mechanism, and the end of the striking member is threadedly connected to this fixed part. Additionally, on the side of the piston opposite the muzzle mechanism, there is an installation seat for mounting the power spring of the nail gun.

In one embodiment, the fixed part has a cross-shaped slot along the horizontal direction and a fixed hole passing through the cross-shaped slot along the vertical direction. The end of the striking member is inserted into this cross-shaped slot, and it has an installation hole corresponding to the fixed hole. The striking member is fixed to the fixed part by a bolt or screw passing through the fixed hole and the installation hole.

The present invention also provides an energy storage control mechanism, which is installed in a nail gun with a casing and is used to control and drive the nail gun's nails to be struck. It comprises the following features: a striking member, an energy storage mechanism used for accumulating energy for the striking member and driving it to move, and a control component used for controlling the operation of the energy storage mechanism. The striking member is as described above.

In one embodiment, the energy storage mechanism includes a guiding rod, which is mounted within the casing through a fixed plate assembly. The guiding rod has a piston movably mounted on it and at least one power spring, which is sleeved around the guiding rod's outer periphery. One end of the power spring abuts against the piston and is compressed and stores energy under the driving of the piston. The control component includes a main switch with a pressing portion and a main switch element, a safety switch with a toggle part and a safety switch element, and a drive motor. The main switch, safety switch, and drive motor are interconnected. When both the main switch element and the safety switch element generate electrical signals, the drive motor operates.

In one embodiment, a guide sleeve is also sleeved on the outer periphery of the guiding rod, and this guide sleeve is located between the power spring and the guiding rod. The length of the guide sleeve is shorter than the compressed length of the power spring.

In particular, in addition to the aforementioned Embodiment 1, the Embodiment 2 includes following features.

Figure 22:
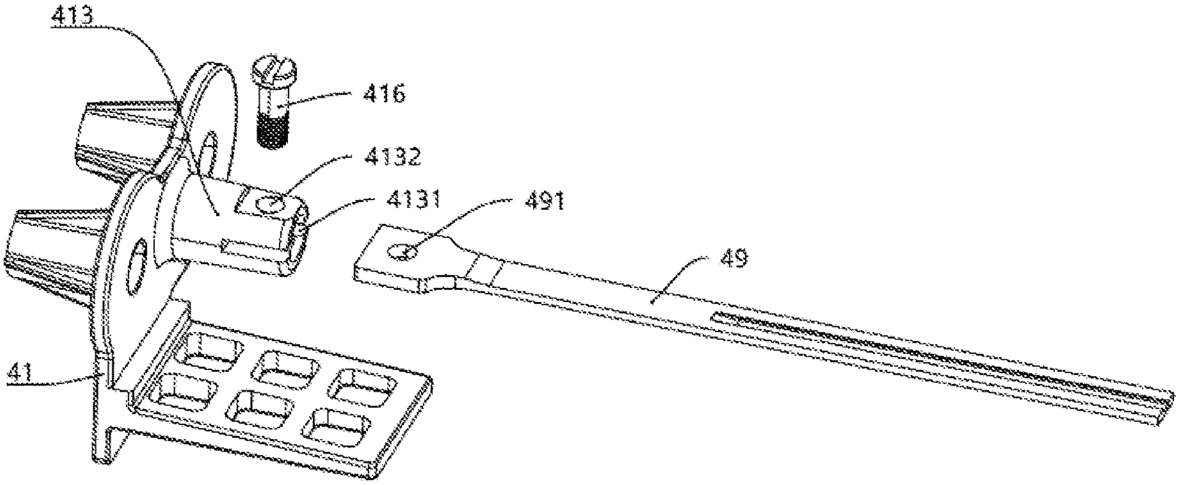
FIG. 22 is an exploded view of a striking member according to one embodiment of the invention.

As shown in FIG. 22, the piston 41 on the side facing the nail is equipped with a fixed part 413 for securing the striking member 49. The fixed part 413 has an overall cylindrical shape, with a cross-shaped slot 4131 opened along the horizontal direction (i.e., the axial direction of the cylinder) at its center. Along the vertical direction (i.e., the radial direction of the cylinder), the cross-shaped slot 4131 is penetrated by a fixing hole 4132. The fixing hole 4132 is a threaded hole with threads. One end of the striking member 49 is inserted into the cross-shaped slot 4131, and the end of the striking member 49 is equipped with an installation hole 491 corresponding to the fixing hole 4132. The striking member 49 is secured to the fixed part 413 by inserting a bolt 416 or screw into the threaded fixing hole 4132. This method of securing the striking member 49 to the fixed part 413 is a detachable installation method. When the striking member 49 wears out and needs replacement, it can be easily removed by disassembling the bolt, making replacement convenient and cost-effective. Additionally, this method does not damage the piston, eliminating the need to replace the piston, which further saves costs.

Advantages and Effects of the Embodiment 2

In addition to the aforementioned embodiment 1, the installation of the striking member 49 to the piston 41 is achieved using a threaded connection. This method of installation is a detachable one. When the striking member 49 becomes worn and requires replacement, it is a simple process to disassemble the bolt, remove the striking member 49, and replace it. This process is highly convenient and does not cause any damage to the piston. There is no need to replace the piston, resulting in cost savings.

Embodiment 3

In addition to the aforementioned Embodiments 1 and 2, the embodiment 3 provides a driving mechanism installed inside a nail gun, used to drive the piston of the nail gun towards the power spring. It has the following technical features: a driving component for moving the piston, a drive motor for rotating the driving component, and a one-way rotation component installed at the output end of the drive motor. The driving component has a pushing section for moving the piston, which includes a first pushing section for engaging with the first pushed-end of the piston and a second pushing section for engaging with the second pushed-end of the piston. The one-way rotation component includes a ratchet disposed onto the output end, with several ratchet teeth, and a pawl located at the side of the ratchet. The pawl is used to insert between the ratchet teeth, enabling one-way rotation of the ratchet. Additionally, there is an elastic component, one end of which is mounted on the drive motor, and the other end abuts against the pawl.

In one embodiment, the drive motor comprises a motor body with an output shaft and a speed reducer installed on the output shaft, which has an output end. Both the elastic component and the pawl are provided in pairs and symmetrically arranged on both sides of the ratchet. The elastic component is in the form of pawl springs, with one end fixed to the drive motor using a securing pin, and the other end bent upwards to form an abutting piece that can be attached to the pawl.

The elastic component includes pawl springs and pawl spring seats, which are fixed to the drive motor using screws. One end of the pawl spring abuts against the pawl spring seat, and the other end abuts against the pawl.

In one embodiment, a one-way rotation component is placed between the drive motor and the driving component, allowing the driving component to push the piston in only one direction. This helps to effectively prevent the piston from being pushed out by the power spring during its movement, ensuring the driving force for striking the nail. Additionally, the one-way rotation component employs the interaction of a ratchet and pawl, which is cost-effective, provides excellent anti-reverse performance, and is highly convenient for installation and replacement.

In particular, in addition to the aforementioned Embodiments 1 and 2, the Embodiment 3 includes following features.

In this embodiment, which is essentially the same as the Embodiments 1 and 2, the difference lies in the implementation of the elastic element of the one-way rotation component 45.

As shown in FIG. 8, the one-way rotation component 45 comprises a ratchet 451, a pawl 452, and an elastic element. One end of the elastic element is mounted on the speed reducing mechanism 442 of the drive motor, while the other end abuts against the pawl 452. In this embodiment, the elastic element is a ratchet spring plate 453. The ratchet 451 is fitted onto the output end 443 and has several ratchet teeth 4511. The pawl 452 is located on the side of the speed reducing mechanism 442, adjacent to the ratchet 451. The pawl 452 is designed to insert between the ratchet teeth 4511, engaging with them to allow the ratchet 451 to rotate in only one direction. One end of the pawl spring plate 453 is fixed on the reduction gear 443 using a fixing pin, while the other end is bent upwards to form an abutment piece 4531, ensuring that it always tends to move towards the pawl 452 and insert into the ratchet teeth 4511.

Figure 23:
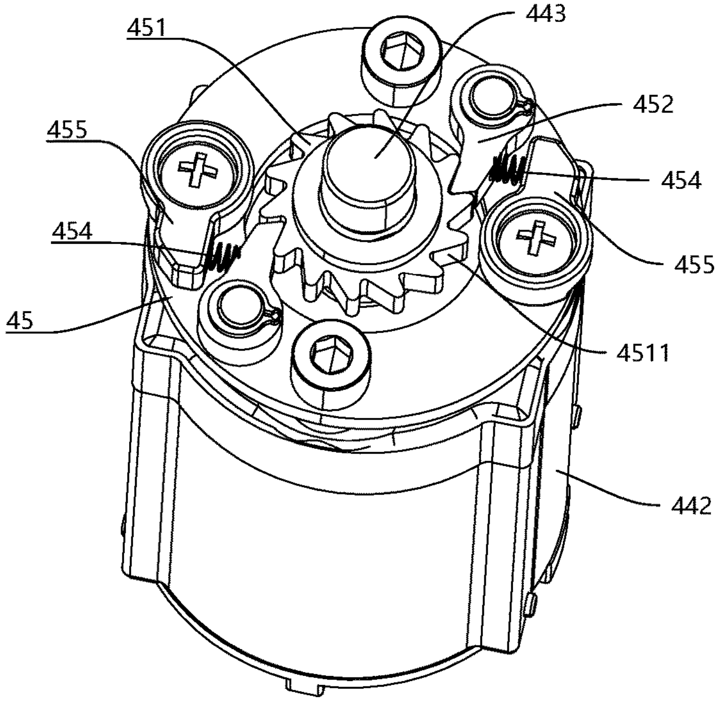
FIG. 23 is a schematic structural view of a one-way rotation component installed on a speeder reducer according to one embodiment of the invention.

FIG. 23 is a schematic diagram illustrating the structure of the one-way rotation component of the present invention mounted on the speed reducer.

In this embodiment, the elastic element has the structure as shown in FIG. 23. The elastic element includes a pawl springs 454 and pawl spring seats 455. The pawl spring seats 455 are fixed to the end face of the speed reducing mechanism 442 of the drive motor with screws. One end of the pawl spring 454 abuts against the pawl spring seat 455, while the other end abuts against the pawl 452. As shown in FIG. 23, in one embodiment, there are two pawls 452, two pawl springs 454, and two pawl spring seats 455, all symmetrically distributed on both sides of the ratchet 451. In practical use, either one or two sets can be used, but using two sets provides better anti-reverse effects. Similarly, in the first embodiment, two pawls 452 can also be symmetrically arranged with two ratchet spring plates 453.

Advantages and Effects of the Embodiment 3

The inclusion of the one-way rotation component 45 between the drive motor 44 and the driving component 43 ensures that the driving component 43 can only push the piston 41 in one direction. This effectively prevents the piston 41 from being prematurely pushed out by the force of the power spring 42 during movement, ensuring the driving force for the nail. Additionally, the one-way rotation component 45, which employs the cooperation of the ratchet 451 and the pawl 452, is cost-effective, provides good protection against motor reversal, and is highly convenient for installation and replacement.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

What is claimed is:

1. A nail gun for striking nails, comprising:

an energy storage mechanism comprising a piston and at least one power spring having a first end abutting against the piston and being configured to be compressed to store energy;

a pushing component comprising at least one pushing section facing the piston for driving the piston towards the at least one power spring for compressing at least one power spring;

a drive motor for driving the pushing component to rotate; and a control mechanism for controlling the energy storage mechanism, wherein the control mechanism comprises a main switch configured to produce a first electronic signal and a safety switch configured to produce a second electronic signal;

wherein the main switch and the safety switch are in communication with the drive motor that is configured to operate when both the first electronic signal and the second electronic signal are received;

wherein the main switch comprises a pressing part and a main switch component; and wherein the safety switch comprises a toggling part and a safety switch component; and wherein the toggling part comprises:

a toggle blade which is configured to contact an activation point of the safety switch component to generate the second electronic signal;

a toggle rod having a first toggle rod end configured to contact the pushing component and a second toggle rod end configured to contact with the toggle blade to push it to disconnect from the activation point of the safety switch component; and a toggle blade seat having a toggle blade reset spring; wherein a first end of the toggle blade reset spring is in contact with the toggle blade; and a second end of the toggle blade reset spring extends out of the toggle blade seat and is in contact with the toggle rod; and wherein the toggle blade is hook-shaped and comprises a contact plate for contacting the activation point of the safety switch component, a toggling plate for contacting the toggle rod, and a connecting plate connecting the contact plate and the toggling plate.

2. The nail gun of claim 1, wherein the contact plate has a contact plate length which is shorter than a length of the toggling plate; and wherein a gap is formed by the difference between the contact plate length and the toggling plate length; and wherein the second electronic signal is generated when the activation point of the safety switch component touches the contact plate; and wherein the second electronic signal is cut off when the activation point locates in the gap.

3. The nail gun of claim 2, wherein the control mechanism further comprises a crank assembly for pushing the toggle blade to interact with the safety switch component; wherein the crank assembly comprises:

an external crank with its outer end extending out of a muzzle mechanism of the nail gun and its inner end inserted into a casing of the nail gun;

an internal crank with its outer end connected to the external crank and its inner end connected to the toggle blade seat; and a crank reset spring disposed adjacent to the internal crank outer end.

4. The nail gun of claim 1, wherein the energy storage mechanism further comprises:

a fixed plate assembly;

a guiding rod attached to the fixed plate assembly;

a guide sleeve moveably disposed around an outer periphery of the guiding rod; and a striking member mounted on the piston for striking nails, wherein the piston is disposed on the guiding rod;

wherein the at least one power spring is disposed around the outer periphery of the guiding rod such that the guide sleeve is disposed between the at least one power spring and the guiding rod.

5. The nail gun of claim 4, wherein the fixed plate assembly comprises a front fixed plate and a rear fixed plate for respectively mounting a front end and a rear end of the guiding rod; and wherein a second end of the at least one power spring abuts against the rear fixed plate.

6. The nail gun of claim 5, wherein the piston is disposed on the front end of the guiding rod in adjacent to the front fixed plate; and a cushion pad is disposed between the piston and the front fixed plate.

7. The nail gun of claim 6, wherein the guide sleeve has a guide sleeve length that is shorter than at least one power spring length of the at least one power spring when the at least one power spring is compressed to a predetermined compressed position.

8. The nail gun of claim 6, wherein the piston comprises a fixed part for securing the striking member, and an installation part receiving the at least one power spring, wherein the installation part is tapered and comprises a large end and a small end, and wherein the installation part comprises a through hole through which the guiding rod passes.

9. The nail gun of claim 8, wherein the guide sleeve comprises a center hole through which the guiding rod passes, and wherein the center hole has a diameter smaller than a diameter of the small end of the installation part.

10. The nail gun of claim 1, further comprising:

at least one pushed-end disposed on the piston configured for being pushed by the at least one pushing section.

11. The nail gun of claim 10, wherein the at least one pushing section comprises a first pushing section and a second pushing section, wherein the at least one pushed-end comprises a first pushed-end and a second pushed-end, wherein the first pushed-end extends from the piston in a striking direction; and the second pushed-end extends from the piston towards the pushing component.

12. The nail gun of claim 11, wherein the first pushing section is configured to push the first pushed-end, and the second pushing section is configured to push the second pushed-end.

13. The nail gun of claim 12, wherein the first pushing section has a diameter larger than a diameter of the second pushing section.

14. The nail gun of claim 13, wherein the pushing component further comprises a crank corner, wherein the crank corner comprises a first crank arm on which the first pushing section is disposed, and a second crank arm on which the second pushing section is disposed; and wherein the first crank arm and the second crank arm form a corner having a degree less than 180 degree.

15. The nail gun of claim 14, wherein the first pushing section and the second pushing section are cylindrical and are respectively disposed on an outer ends of the first crank arm and the second crank arm, and wherein the first pushing section protrudes from an outer end of the first crank arm.

* * * * *